(12) United States Patent
Iguchi et al.

(10) Patent No.: US 12,381,040 B2
(45) Date of Patent: *Aug. 5, 2025

(54) ELECTRONIC DEVICE

(71) Applicant: TDK CORPORATION, Tokyo (JP)

(72) Inventors: Toshihiro Iguchi, Tokyo (JP); Daisuke Yoshida, Tokyo (JP); Kazunori Oshima, Tokyo (JP)

(73) Assignee: TDK CORPORATION, Tokyo (JP)

(*) Notice: Subject to any disclaimer, the term of this patent is extended or adjusted under 35 U.S.C. 154(b) by 143 days.

This patent is subject to a terminal disclaimer.

(21) Appl. No.: 18/464,467

(22) Filed: Sep. 11, 2023

(65) Prior Publication Data

US 2024/0112865 A1 Apr. 4, 2024

(51) Int. Cl.
*H01G 4/30* (2006.01)
*H01G 4/012* (2006.01)
*H01G 4/10* (2006.01)
*H01G 4/248* (2006.01)

(52) U.S. Cl.
CPC .............. *H01G 4/30* (2013.01); *H01G 4/012* (2013.01); *H01G 4/10* (2013.01); *H01G 4/248* (2013.01)

(58) Field of Classification Search
CPC ............ H01G 4/30; H01G 4/012; H01G 4/10; H01G 4/248
See application file for complete search history.

(56) References Cited

U.S. PATENT DOCUMENTS

| | | | |
|---|---|---|---|
| 2002/0075632 A1* | 6/2002 | Nakano | H01G 4/12 361/320 |
| 2005/0117274 A1* | 6/2005 | Miyauchi | H01G 4/12 361/321.2 |
| 2010/0195260 A1* | 8/2010 | Ishihara | H01G 4/30 361/313 |
| 2011/0235233 A1* | 9/2011 | Ando | H01G 4/1227 361/301.4 |
| 2011/0304946 A1* | 12/2011 | Koga | H01C 7/123 361/118 |
| 2017/0025222 A1* | 1/2017 | Park | H01G 4/1209 |
| 2021/0012968 A1* | 1/2021 | Taniguchi | H01G 4/1227 |
| 2022/0102077 A1* | 3/2022 | Kitahara | H01G 4/008 |
| 2022/0139624 A1* | 5/2022 | Sim | H01G 4/224 361/301.4 |
| 2023/0080684 A1* | 3/2023 | Kim | H01G 4/30 361/321.2 |

FOREIGN PATENT DOCUMENTS

JP 2001-220224 A 8/2001

* cited by examiner

*Primary Examiner* — Michael P McFadden
(74) *Attorney, Agent, or Firm* — Oliff PLC

(57) ABSTRACT

An electronic device includes an element body. The element body includes a first internal electrode layer, a second internal electrode layer, and a dielectric layer laminated between the first internal electrode layer and the second internal electrode layer. Ni oxide particles exist at a first boundary between the first internal electrode layer and the dielectric layer. The dielectric layer includes a dielectric large particle in contact with both of the Ni oxide particles at the first boundary and the second internal electrode layer.

7 Claims, 12 Drawing Sheets

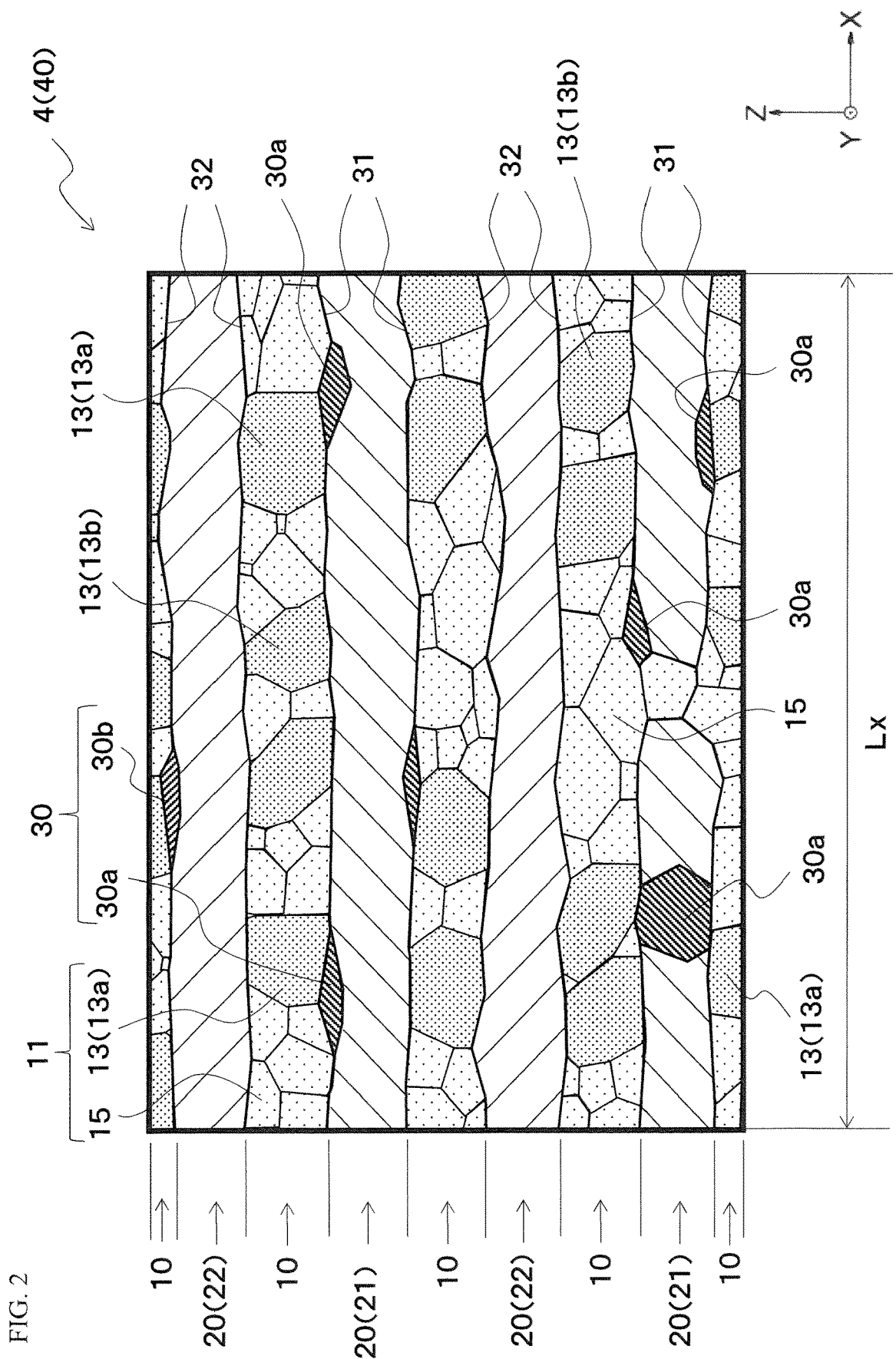

ELECTRONIC DEVICE

The present application claims a priority based on Japanese Patent Application No. 2022-156607 filed on Sep. 29, 2022 and incorporates it into the present specification by reference to that disclosure in its entirety.

BACKGROUND OF THE INVENTION

The present invention relates to an electronic device including a dielectric layer and an internal electrode layer.

Various electronic devices, such as ceramic capacitors, diodes, resistances, transistors, and inductors, are incorporated in circuits, such as electronic circuits and power supply circuits. Each electronic device in a circuit has its own specific function. If a single electronic device can have the functions of multiple elements, it may be possible to reduce the number of types of electronic devices constituting the circuit.

For example, a ceramic capacitor as disclosed in Patent Document 1 (JP2001220224 (A)) has a structure in which dielectric layers and inner electrode layers are laminated and has a function of storing electric charges, a function of passing an alternating electric current without passing a direct electric current, and the like. If this ceramic capacitor has not only the above-mentioned functions but also a rectification action like a diode, it may be possible to simplify the circuit.

BRIEF SUMMARY OF THE INVENTION

It is an object of an exemplary embodiment according to the present disclosure to provide an electronic device being capable of storing electric charges and having a rectification action such that a resistance in one direction is lower than that in the other direction.

To achieve the above object, an electronic device according to a first aspect of the present disclosure comprises:
an element body including:
  a first internal electrode layer;
  a second internal electrode layer; and
  a dielectric layer laminated between the first internal electrode layer and the second internal electrode layer,
wherein
Ni oxide particles exist at a first boundary between the first internal electrode layer and the dielectric layer, and
the dielectric layer includes a dielectric large particle in contact with both of the Ni oxide particles at the first boundary and the second internal electrode layer.

Conventional ceramic capacitors including a dielectric layer and an internal electrode layer are considered favorable to have a high resistance value as shown in Patent Document 1. On the other hand, the electronic device according to the first aspect has the above-mentioned features and can thus have a resistance value in one direction lower than that in the other direction. That is, the electronic device according to the first aspect can store electric charges as a capacitor and can also have a rectification action like a diode.

Preferably, the Ni oxide particles are in contact with both of two dielectric layers next to each other via the first internal electrode layer.

The first internal electrode layer comprises first internal electrode layers, the second internal electrode layer comprises second internal electrode layer, the dielectric layer comprises dielectric layers in the element body, and each of the first internal electrode layers is preferably in contact with two or more Ni oxide particles on average in a cross section of the element body.

The first internal electrode layer comprises first internal electrode layers, the second internal electrode layer comprises second internal electrode layer, the dielectric layer comprises dielectric layers in the element body, and NP1/NP0 is preferably 0.6 or more, in which NP0 is a total number of the Ni oxide particles observed in a cross section of the element body, and NP1 is a number of the Ni oxide particles existing at the first boundary among the Ni oxide particles observed in the cross section.

The first internal electrode layer comprises first internal electrode layers, the second internal electrode layer comprises second internal electrode layer, the dielectric layer comprises dielectric layers in the element body, and $NP_L/LE$ is preferably 0.002 or more particles/µm, in which LE is a total length of the first internal electrode layers and the second internal electrode layers observed in a cross section of the element body, and $NP_L$ is a number of the Ni oxide particles in contact with the first internal electrode layers or the second internal electrode layers in a range of the total length LE.

Preferably, $d_P/d_M$ is 3 or more, in which $d_M$ is an average particle size of metal crystals contained in the first internal electrode layer and the second internal electrode layer, and $d_P$ is an average particle size of the Ni oxide particles.

An electronic device according to a second aspect of the present disclosure comprises:
an element body including:
  a first internal electrode layer;
  a second internal electrode layer; and
  a dielectric layer laminated between the first internal electrode layer and the second internal electrode layer,
wherein
a p-type semiconductor particle exists at a first boundary between the first internal electrode layer and the dielectric layer, and
the dielectric layer includes a dielectric large particle in contact with both of the p-type semiconductor particle at the first boundary and the second internal electrode layer.

The electronic device according to the second aspect has the above-mentioned features and can thus have a resistance value in one direction lower than that in the other direction. That is, similarly to the above-mentioned electronic device according to the first aspect, the electronic device according to the second aspect can store electric charges as a capacitor and can also have a rectification action like a diode.

BRIEF DESCRIPTION OF THE DRAWING(S)

FIG. 2 is an enlarged schematic view of the cross section of an element body shown in FIG. 1;

DETAILED DESCRIPTION OF THE INVENTION

Hereinafter, an embodiment of the present disclosure is described with reference to the drawings.

Figure 1:
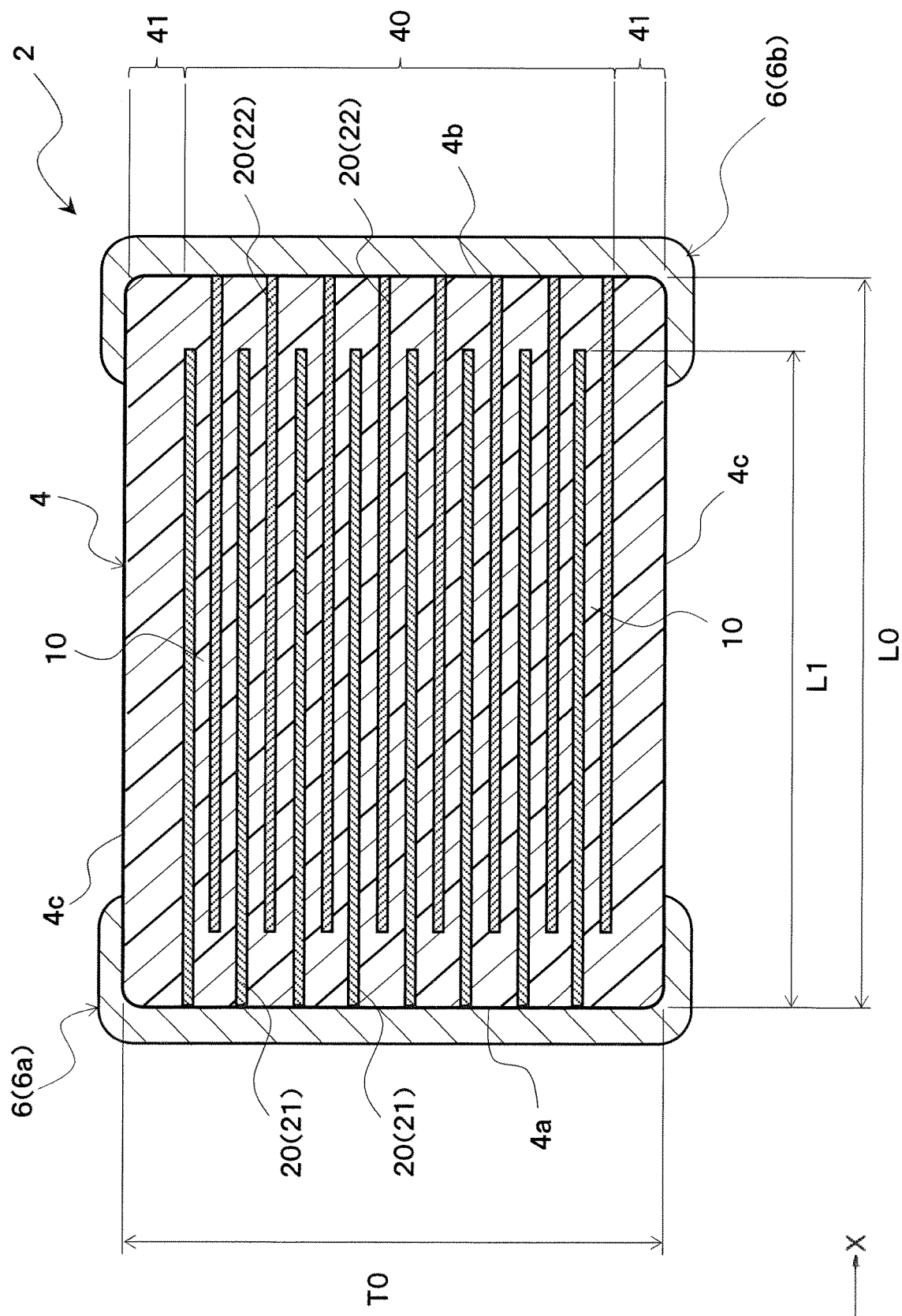
FIG. 1 is a schematic view illustrating a cross section of an electronic device according to an embodiment of the present disclosure.

As shown in FIG. 1, a multilayer ceramic electronic device 2 according to the present embodiment includes an element body 4 and a pair of external electrodes 6 formed on an outer surface of the element body 4.

The element body 4 shown in FIG. 1 normally has a substantially rectangular parallelepiped shape and includes two end surfaces 4a and 4b along the Y-Z plane and four side surfaces 4c connecting the two end surfaces 4a and 4b. However, the shape of the element body 4 is not limited and may be an elliptical columnar shape, a cylindrical columnar shape, a prismatic shape, or the like. The outer dimensions of the element body 4 are not limited, either. For example, the length L0 in the X-axis direction can be 0.2 mm to 5.7 mm, the width W0 in the Y-axis direction can be 0.1 mm to 5.0 mm, and the height TO in the Z-axis direction can be 0.1 mm to 3.0 mm. Note that, in the present embodiment, the X-axis, the Y-axis, and the Z-axis are perpendicular to each other.

As the pair of external electrodes 6, the multilayer ceramic electronic device 2 includes a first external electrode 6a in contact with one end surface 4a and a second external electrode 6b in contact with the other end surface 4b. The first external electrode 6a and the second external electrode 6b are electrically insulated so as not to contact with each other in the X-axis direction. Each of the external electrodes 6 is conductive, and the specifications (material, structure, thickness, etc.) of each of the external electrodes 6 are not limited. Each of the external electrodes 6 may include a baked electrode layer, a resin electrode layer, a plated electrode layer, etc. and may have a single-layer structure or a multilayer structure with a plurality of electrode layers. For example, each of the external electrodes 6 may have a three-layer structure of a baked electrode layer containing Cu, a Ni plating layer, and an Sn plating layer (laminated in this stated order).

The element body 4 includes a capacitance region 40 and exterior regions 41 located on the outside of the capacitance region 40. The capacitance region 40 includes dielectric layers 10 and internal electrode layers 20 substantially parallel to a plane including the X-axis and Y-axis, and the dielectric layers 10 and the internal electrode layers 20 are laminated alternately along the Z-axis. Here, "substantially parallel" means that most portions are parallel, but there may be portions that are not parallel to some extent, and both of the dielectric layers 10 and the internal electrode layers 20 may be slightly uneven or inclined.

The internal electrode layers 20 in the capacitance region 40 can be classified into first internal electrode layers 21 and second internal electrode layers 22. A part of the edge of each of the first internal electrode layers 21 is exposed to one end surface 4a, and each of the first internal electrode layers 21 is electrically connected to the first external electrode 6a. A part of the edge of each of the second internal electrode layers 22 is exposed to the other end surface 4b, and each of the second internal electrode layers 22 is electrically connected to the second external electrode 6b.

Each of the dielectric layers 10 in the capacitance region 40 is laminated between the first internal electrode layer 21 and the second internal electrode layer 22. In other words, the first internal electrode layer 21 and the second internal electrode layer 22 are insulated from each other via the dielectric layer 10. Thus, the capacitance region 40 has a structure in which the first internal electrode layers 21, the dielectric layers 10, and the second internal electrode layers 22 are repeatedly laminated in this stated order. When voltage is applied to the multilayer ceramic electronic device 2, the first external electrode 6a and the second external electrode 6b have polarities different from each other, and voltage can be applied to each of the dielectric layers 10 in the capacitance region 40. That is, electric charge can be stored in each of the dielectric layers 10, and the multilayer ceramic electronic device 2 functions as a capacitor due to the multilayer structure of the dielectric layers 10 and the internal electrode layers 20.

In the present embodiment, the junction interfaces between the dielectric layers 10 and the first internal electrode layers 21 are referred to as first boundaries 31, and the junction interfaces between the dielectric layers 10 and the second internal electrode layers 22 are referred to as second boundaries 32. Note that, in the description of the present embodiment, when the term "internal electrode layers 20" is generically used without distinguishing between the first internal electrode layers 21 and the second internal electrode layers 22, the description with the term "internal electrode layers 20" is related to the first internal electrode layers 21 and the second internal electrode layers 22 in common.

The exterior regions 41 are laminated on the outer side of the capacitance region 40 in the Z-axis direction and cover the upper surface and the lower surface of the capacitance region 40. Also, the exterior regions 41 may exist on the outer side of the capacitance region 40 in the Y-axis direction. That is, the side surfaces of the capacitance region 40 intersecting the Y-axis may be covered with the exterior regions 41 not including the internal electrode layers 20. The material and thickness of the exterior regions 41 are not limited. For example, the exterior regions 41 may contain a dielectric compound having a composition similar to that of the dielectric layers 10 and may contain a glass component along with the dielectric compound. In principle, the exterior regions 41 are regions that do not include the internal electrode layers 20, but may include a dummy electrode that does not contribute to capacitance.

The dielectric layers 10 contain a dielectric compound as a main component. The main component of the dielectric layers 10 is a component that accounts for 80 mol % or more in the dielectric layers 10, and the material of the dielectric compound, which is the main component, is not limited. For example, the main component of the dielectric layers 10 is a dielectric compound having a perovskite structure, such as $BaTiO_3$, $Ba(Ti, Zr)O_3$, $(Ba, Ca)TiO_3$, $(Ba, Ca)(Ti, Zr)O_3$, $(Ca, Sr)TiO_3$, $(Ca, Sr)ZrO_3$, $(Ca, Sr)(Zr, Ti)O_3$, and (K, Na)NbO$_3$, or a dielectric compound having a tungsten bronze structure, such as Ba$_3$ZrNb$_4$O$_{15}$, Ba$_3$TiNb$_4$O$_{15}$, and (K, Na)Sr$_2$Nb$_5$O$_{15}$.

Moreover, the dielectric layers 10 may contain one or more types of subcomponents along with the main component. The types and the content rate of subcomponents contained in the dielectric layers 10 are not limited. For example, as subcomponents, the dielectric layers 10 may contain a Si compound, an Al compound, an Mn compound, a Mg compound, a Cr compound, a Ni compound, a compound containing a rare earth element, a Li compound, a B compound, a V compound, or the like. Note that, the main component and the subcomponents of the dielectric layers 10 can be determined by component analysis using wavelength dispersive X-ray spectrometer (WDS), energy dispersive X-ray spectrometer (EDS), laser ablation ICP mass spectrometry (LA-ICP-MS), etc.

The average thickness $T_{DL}$ of the dielectric layers 10 is preferably 1.7 μm or less, more preferably 0.17 μm or more and 0.86 μm or less. Moreover, the capacitance region 40 includes at least one dielectric layer 10, and the lamination number of dielectric layers 10 in the capacitance region 40 is not limited. For example, the capacitance region 40 preferably includes 20 or more dielectric layers 10, more preferably 50 or more dielectric layers 10. Note that, the average thickness $T_{DL}$ of the dielectric layers 10 is calculated by observing a cross section of the element body 4 using a metallurgical microscope or an electron microscope. For example, it is preferable to analyze five or more dielectric layers 10, and the average thickness $T_{DL}$ of the dielectric layers 10 is preferably calculated by measuring the thickness of each of the dielectric layers 10 to be analyzed at least at 30 points.

Each of the dielectric layers 10 includes a plurality of dielectric particles 11 and grain boundaries 17 as interfaces between dielectric particles 11 next to each other. The dielectric particles 11 are crystal particles containing a main component of the dielectric layers 10, and the dielectric particles 11 in the dielectric layers 10 can be analyzed by observing a cross section of the element body 4 using an electron microscope, such as a scanning electron microscope (SEM) and a scanning transmission electron microscope (STEM). The subcomponents of the dielectric layers 10 may be solid-soluted in the dielectric particles 11, and the dielectric particles 11 may have a core-shell structure by solid solution of the subcomponents. Moreover, the dielectric layers 10 may contain a segregation phase in which the concentration of the predetermined element is higher than that in the dielectric particles 11.

The average particle size $d_{DP}$ of the dielectric particles 11 is preferably 0.05 μm or more, more preferably 0.1 μm or more and 1 μm or less. Also, the ratio ($T_{DL}/d_{DP}$) of the average thickness $T_{DL}$ of the dielectric layers 10 to the average particle size $d_{DP}$ of the dielectric particles 11 is preferably 1.5 or less, more preferably 1 or less. Note that, the average particle size $d_{DP}$ of the dielectric particles 11 is an arithmetic mean value of equivalent circle diameters of the dielectric particles 11. For example, it is preferable to observe a cross section of the dielectric layers 10 and analyze five or more dielectric layers 10, and the average particle size $d_{DP}$ is preferably calculated by measuring equivalent circle diameters of at least 50 dielectric particles 11.

When a cross section of dielectric layers 10 along their thickness direction (Z-axis direction) is analyzed, the dielectric particles 11 can be classified into large particles 13 and small particles 15. That is, in the description of the present embodiment, the "dielectric particles 11" are a general term for the large particles 13 and the small particles 12, and the dielectric particles 11 include the large particles 13 and the small particles 12.

The large particle 13 is the dielectric particle 11 in contact with both of the first boundary 31 (joint boundary between the dielectric layer 10 and the first internal electrode layer 21) and the second boundary 32 (joint boundary between the dielectric layer 10 and the second internal electrode layer 22). That is, the large particle 13 is the dielectric particle 11 appearing on both of the upper surface and the lower surface of the dielectric layer 10 containing this large particle 13. The length of the large particle 13 in the Z-axis direction substantially corresponds with the thickness of the dielectric layer 10 at the existence location of this large particle 13. On the other hand, the small particle 15 is the dielectric particle 11 other than the large particle 13. That is, the dielectric particle 11 in contact with only one of the first boundary 31 and the second boundary 32 and the dielectric particle 11 not in contact with either the first boundary 31 or the second boundary 32 correspond with the small particles 15.

The average number of large particles 13 contained in the dielectric layers 10 per unit length is preferably 0.05 particles/μm or more, more preferably 0.1 particles/μm or more. The upper limit of the average number of large particles 13 is not limited and may be, for example, 3 particles/μm or less.

The average number of large particles 13 described above is represented by ND/LD, where LD is a total length of dielectric layers 10 observed in a cross section of the capacitance region 40, and ND is a number of large particles 13 contained in the dielectric layers 10 having the total length LD. In the calculation of ND/LD, it is preferable to analyze five or more dielectric layers 10, and the total length LD of the dielectric layers 10 is preferably 30 μm or more. Moreover, it is preferable to determine the analysis field of view so that the edge of the analysis field of view is substantially parallel to the dielectric layers 10. In this case, the length of the edge of the analysis field of view substantially parallel to the dielectric layers 10 can be regarded as the length of the dielectric layers 10 in this analysis field of view. For example, the length of each of the dielectric layers 10 in FIG. 2 may be regarded as a length $L_X$ of the analysis field of view in the X-axis direction.

Each of the internal electrode layers 20 is conductive and contains a metal component. The composition of the internal electrode layers 20 is not limited. For example, as the metal component, the internal electrode layers 20 may contain at least one selected from Ni, Cu, Ag, Pd, Au, and Pt. When the main component of the dielectric layers 10 has reduction resistance, the metal component of the internal electrode layers 20 is preferably pure Ni or a Ni alloy containing 85 wt % or more of Ni. In this case, the Ni alloy may contain subcomponents, such as Cu, Cr, and Mn. Note that, the metal component of the internal electrode layers 20 can be determined by component analysis using WDS, EDS, LA-ICP-MS, etc.

As an inhibitor, the internal electrode layers 20 may contain particles of a dielectric compound having a composition similar to that of the main component of the dielectric layers 10. Moreover, the internal electrode layers 20 may contain a fine amount (e.g., about 0.1 mass % or less) of a non-metallic element, such as S and P, and may contain voids. When the internal electrode layers 20 are observed in a cross section as shown in FIG. 1 and FIG. 2, there may be a location where the internal electrode layers 20 appear to be partially cut off.

The internal electrode layers 20 are laminated between the dielectric layers 10 in the Z-axis direction, and the lamination number of internal electrode layers 20 in the capacitance region 40 is determined based on the lamination number of dielectric layers 10. The average thickness $T_{EL}$ of the internal electrode layers 20 is not limited and is, for example, preferably 3 μm or less, more preferably 0.2 μm or more and 1 μm or less. The average thickness $T_{EL}$ of the internal electrode layers 20 is calculated by observing a cross section of the element body 4 using a metallurgical microscope or an electron microscope. For example, it is preferable to analyze five or more internal electrode layers 20, and the average thickness $T_{EL}$ of the internal electrode layers 20 is preferably calculated by measuring the thickness of each of the internal electrode layers 20 to be analyzed at least at 30 points.

When a cross section of the internal electrode layers 20 is analyzed by a combination of STEM or SEM and EDS or WDS, it can be confirmed that the internal electrode layers 20 contain crystal particles of the metal component (hereinafter, referred to as metal crystals). The average particle size $d_M$ of the metal crystals contained in each of the internal electrode layers 20 is not limited and is, for example, preferably 1 μm or less, more preferably 0.03 μm or more and 0.8 μm or less. Note that, the average particle size $d_M$ of the metal crystals is an arithmetic mean value of circle equivalent diameters of the metal crystals. For example, it is preferable to observe a cross section of the internal electrode layers 20 and analyze five or more internal electrode layers 20, and the average particle size $d_M$ is preferably calculated by measuring circle equivalent diameters of at least 50 metal crystals contained in each of the internal electrode layers 20 to be analyzed.

As shown in FIG. 2, the capacitance region 40 contains Ni oxide particles 30. The Ni oxide particles 30 mainly contain NiO and may slightly contain elements contained in the dielectric layers 10 and the internal electrode layers 20. The amount of components other than NiO in the Ni oxide particles 30 is not limited, but the total content rate of Ni and O in each of the Ni oxide particles 30 is preferably 80 mol % or more. Note that, the Ni oxide particles 30 in the capacitance region 40 can be determined by performing a mapping analysis in the cross section of the element body 4 as shown in FIG. 2. For example, a mapping image of Ni and a mapping image of O (oxygen) are photographed, and regions having a concentration of Ni higher than that of the dielectric layers 10 and a concentration of O higher than that of the internal electrode layers 20 are determined as the Ni oxide particles 30.

The Ni oxide particles 30 in the capacitance region 40 can be classified into two particle groups according to their existence locations. Specifically, the capacitance region 40 includes contain the Ni oxide particles 30 existing at the first boundaries 31 between the dielectric layers 10 and the first internal electrode layers 21 and may include the Ni oxide particles 30 existing at locations other than the first boundaries 31.

In the present embodiment, the Ni oxide particles 30 existing at the first boundaries 31 are referred to as "first Ni oxide particles 30a", and the Ni oxide particles 30 other than the first Ni oxide particles 30a are referred to as "second Ni oxide particles 30b". Here, more specifically, "existing at the first boundaries 31" means that the first Ni oxide particles 30a are in contact with both of the dielectric particles 11 of the dielectric layers 10 and the metal components of the first internal electrode layers 21. The first Ni oxide particles 30a may exist so as to enter the first internal electrode layers 21 from the first boundaries 31 or may exist so as to enter the dielectric layers 10 from the first boundaries 31.

The second Ni oxide particles 30b are the Ni oxide particles 30 existing at locations other than the first boundaries 31. For example, the Ni oxide particles 30 existing at the second boundaries 32, the Ni oxide particles 30 contained in the internal electrode layers 20 and not in contact with the dielectric layers 10, and the Ni oxide particles 30 contained in the dielectric layers 10 and not in contact with the internal electrode layers 20 correspond with the second Ni oxide particles 30b.

The first Ni oxide particles 30a are described in more detail. The capacitance region 40 includes the first Ni oxide particles 30a in contact with the large particles 13 of the dielectric layers 10 and may include the first Ni oxide particles 30a not in contact with the large particles 13 but in contact with the small particles 15. In other words, the dielectric layers 10 include the large particles 13 in contact with the first Ni oxide particles 30a and may include the large particles 13 not in contact with the first Ni oxide particles 30a. In the present embodiment, the large particles 13 in contact with the first Ni oxide particles 30a are referred to as "first large particles 13a", and the large particles 13 not in contact with the first Ni oxide particles 30a are referred to as "second large particles 13b". Preferably, at the second boundaries 32, the first large particles 13a are in contact with the metal component of the second internal electrode layers 22 and are not in contact with the second Ni oxide particles 30b.

Figure 3A:
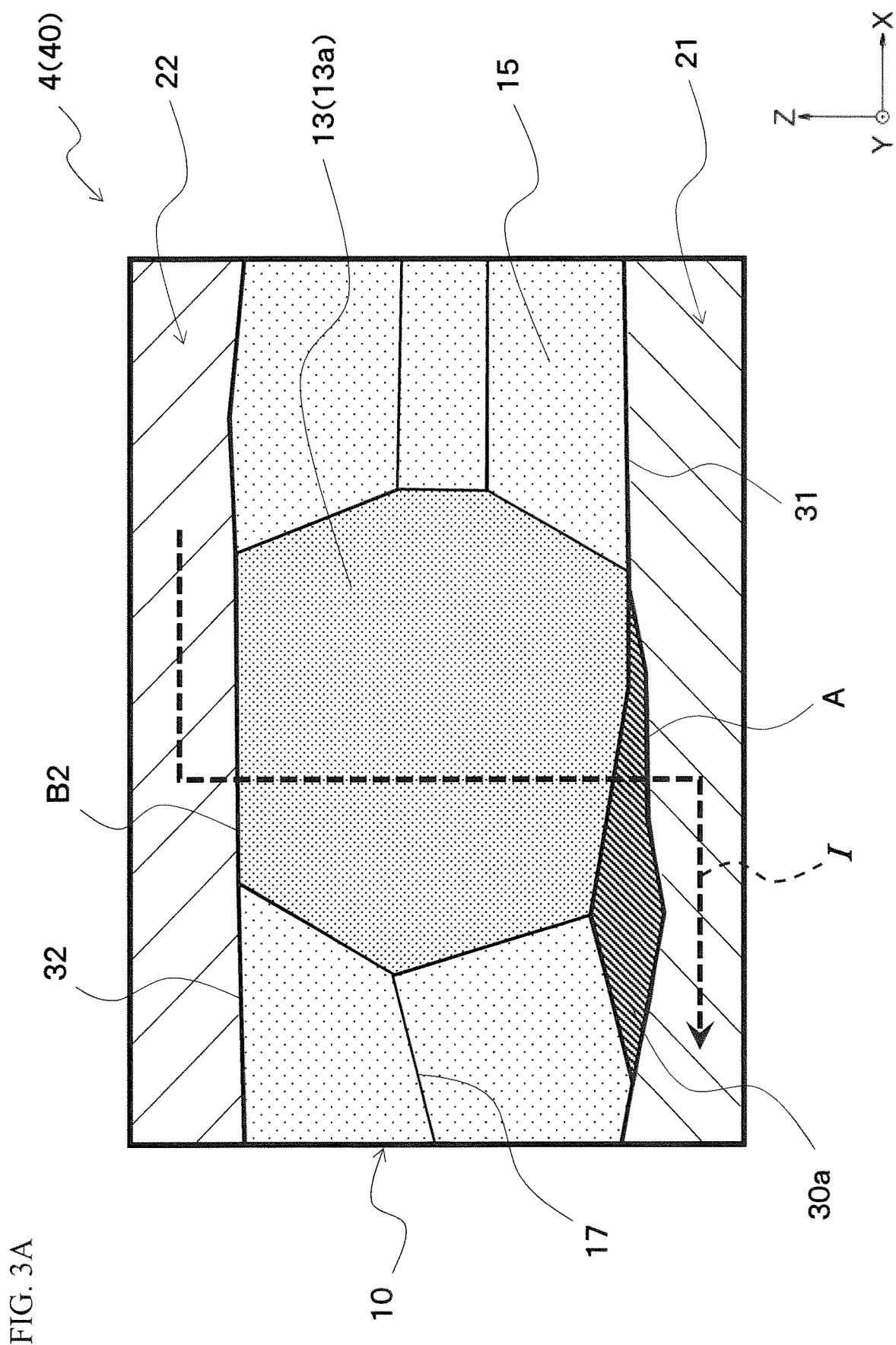
FIG. 3A is an enlarged schematic view of a part of a boundary between a dielectric layer and internal electrode layers.

FIG. 3A is an enlarged schematic view of a cross section of a contact point between the first Ni oxide particle 30a and the first large particle 13a. As shown in FIG. 3A, at the contact point between the first Ni oxide particle 30a and the first large particle 13a, there is a structure in which the metal component of the first internal electrode layer 21, the first Ni oxide particle 30a, the first large particle 13a, and the metal component of the second internal electrode layer 22 are connected in this stated order. Since the capacitance region 40 of the multilayer ceramic electronic device 2 has the structure shown in FIG. 3A, a diode-like rectification action can be obtained.

Here, "diode-like rectification action" means that the resistance value in one direction is lower than the resistance value in the other direction, and "one direction" and "the other direction" mean an application direction of voltage to the multilayer ceramic electronic device 2. For example, $R_I$ is defined as a resistance value when voltage is applied with the first external electrode 6a side as the positive electrode (i.e., the first internal electrode layer 21 side as the positive electrode) and the second external electrode 6b side as the negative electrode (i.e., the second internal electrode layer 22 side as the negative electrode). On the other hand, Ru is defined as a resistance value when voltage is applied with the first external electrode 6a side as the negative electrode and the second external electrode 6b side as the positive electrode. "The resistance value in one direction is lower than the resistance value in the other direction" means that $R_I < R_{II}$ or $R_I > R_{II}$ is satisfied. The reason why such a rectification action is obtained is not necessarily clear, but a Schottky junction is considered to be involved. Hereinafter, a hypothesis for such a rectification action is described based on FIG. 3A and FIG. 3B.

First, a junction interface A between the metal component of the first internal electrode layer 21 and the first Ni oxide particle 30a exists at the first boundary 31, and a junction interface B2 between the metal component of the second internal electrode layer 22 and the first large particles 13a exists at the second boundary 32 (see FIG. 3A). Here, the dielectric compound as the main component of the dielectric layers 10 is considered to be an n-type semiconductor that uses free electrons as carriers to carry electric charges. That is, the dielectric particles 11 are considered to have properties as n-type semiconductor particles. On the other hand, NiO is considered to be a p-type semiconductor that uses holes as carriers, which is rare among oxides. That is, the Ni oxide particles 30 are considered to have properties as p-type semiconductor particles.

At the junction interface A, a Schottky junction is considered to occur between the metal and the p-type semiconductor, and electric current is considered to easily flow from the first Ni oxide particle 30a toward the first internal electrode layer 21. On the other hand, at the junction interface B2, a Schottky junction is considered to occur between the metal and the n-type semiconductor, and electric current is considered to easily flow from the second internal electrode layer 22 toward the first large particle 13a. Due to the two types of Schottky junctions as described above, an equivalent circuit EC shown in FIG. 3B is considered to be formed at the contact point between the first Ni oxide particle 30a and the first large particle 13a.

A Schottky diode SD-p in the equivalent circuit EC corresponds with the junction interface A between the first internal electrode layer 21 and the first Ni oxide particle 30a, and a Schottky diode SD-n corresponds with the junction interface B2 between the first large particle 13a and the second internal electrode layer 22. Also, a resistance R1 in the equivalent circuit EC corresponds with the first large particle 13a, and a resistance R2 corresponds with the first Ni oxide particle 30a. In the equivalent circuit EC, electric current tends to flow counterclockwise, and the resistance value when electric current flows counterclockwise is lower than the resistance value when electric current flows clockwise.

That is, it is considered that an electric current I tends to flow in the direction of the dashed line shown in FIG. 3A at the contact point between the first Ni oxide particle 30a and the first large particle 13a, and the resistance value when voltage is applied with the second internal electrode layer 22 as the positive electrode and the first internal electrode layer 21 as the negative electrode is considered to be lower than the resistance value when voltage is applied from the opposite direction (the first internal electrode layer 21 as the positive electrode and the second internal electrode layer 22 as the negative electrode). As described above, the two types of Schottky junctions generated at the junction interface A and the junction interface B2 are considered to contribute to the appearance of rectification action.

Figure 4A:
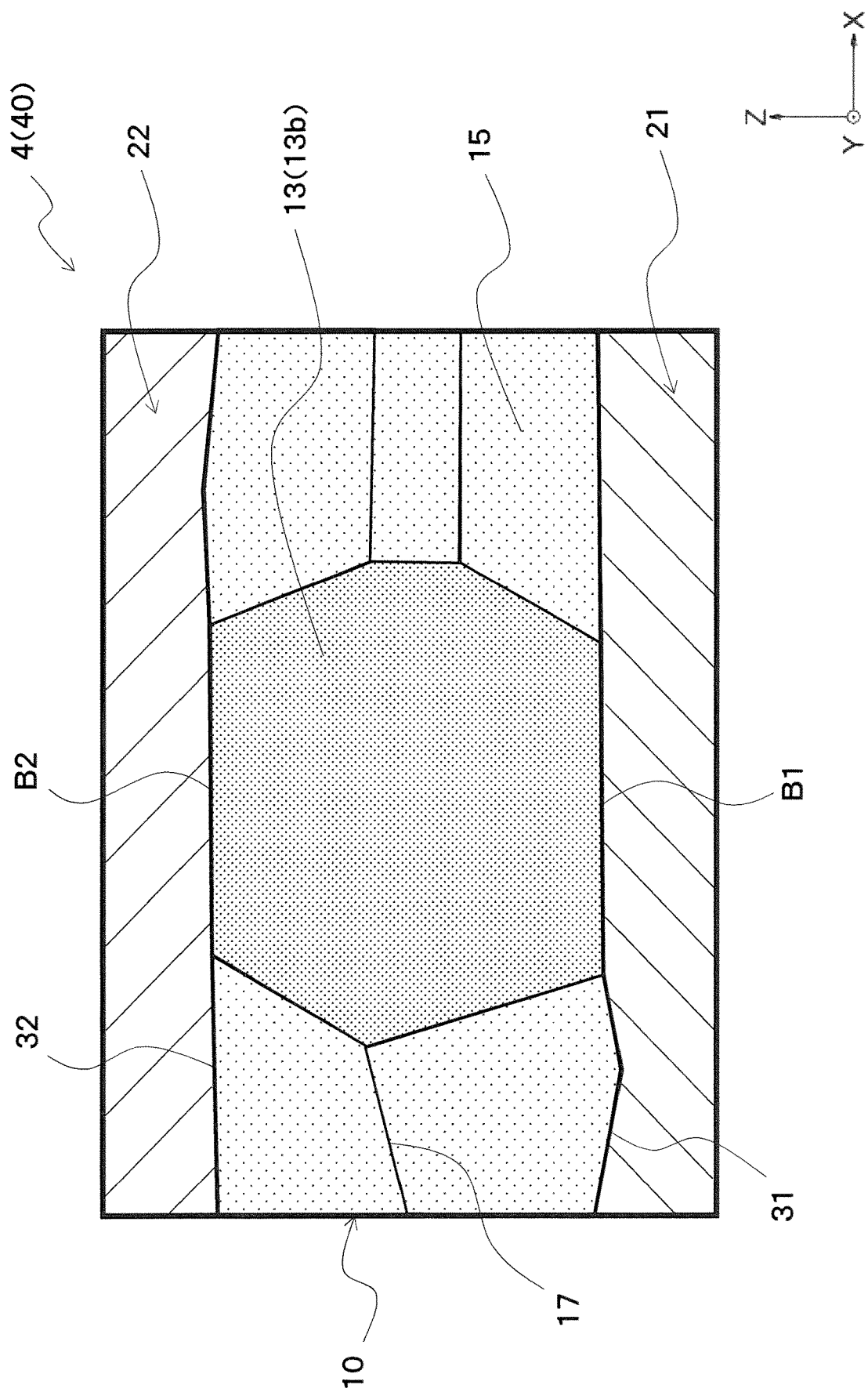
FIG. 4A is an enlarged schematic view of a part of a boundary between a dielectric layer and internal electrode layers.

Note that, FIG. 4A is an enlarged schematic view of a cross section of an existence location of the second large particle 13b. As shown in FIG. 4A, at the existence location of the second large particle 13b, there is a structure in which the metal component of the first internal electrode layer 21, the second large particle 13b, and the metal component of the second internal electrode layer 22 are connected in this stated order. Then, the first boundary 31 includes a junction interface B1 between the metal component of the first internal electrode layer 21 and the second large particle 13b, and the second boundary 32 includes a junction interface B2 between the metal component of the second internal electrode layer 22 and the second large particle 13b.

Figure 4B:
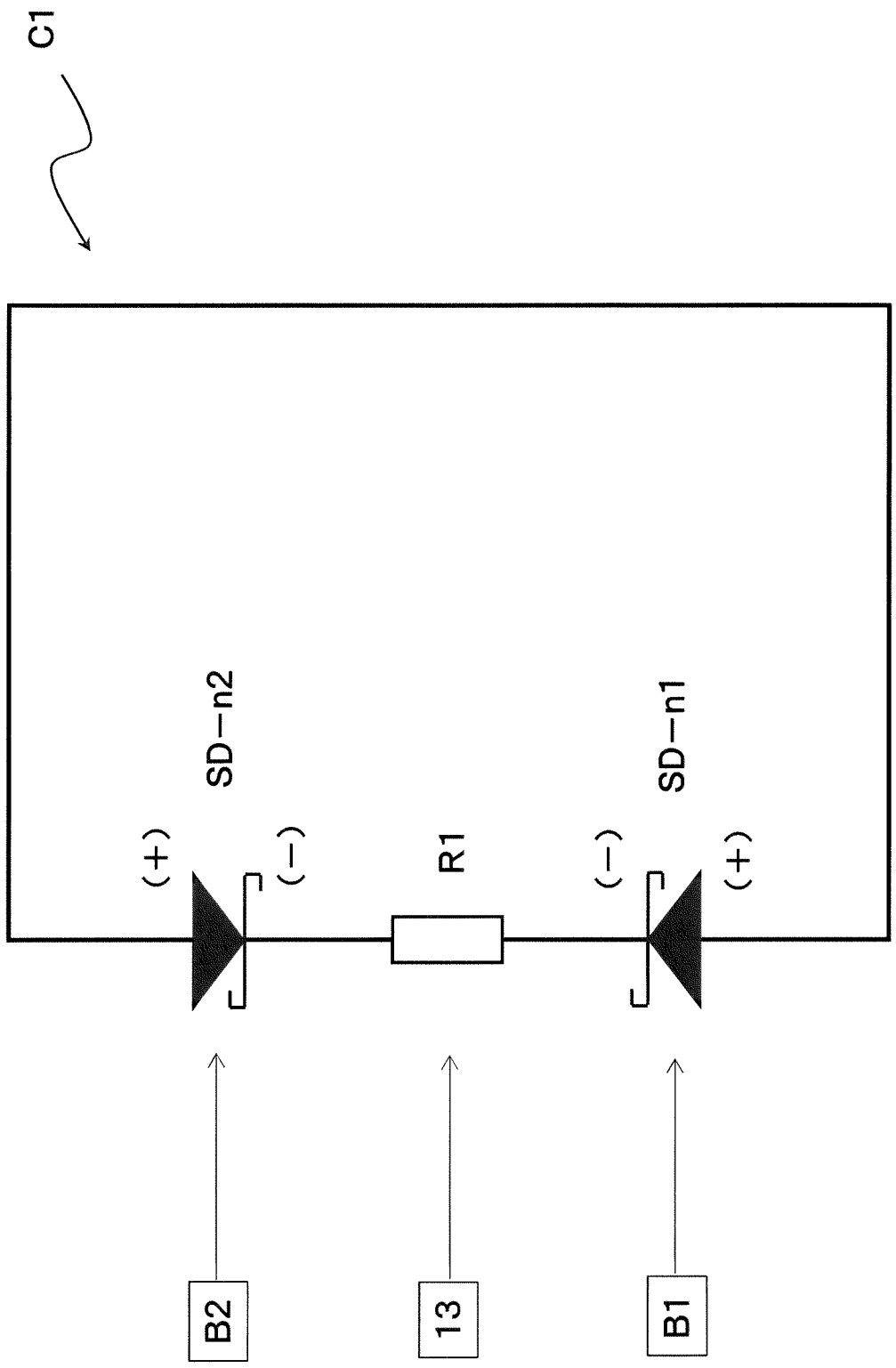
FIG. 4B is a conceptual view illustrating an equivalent circuit relating to the structure shown in FIG. 4A.

At both of the junction interfaces B1 and B2 shown in FIG. 4A, a Schottky junction is considered to occur between the metal and the n-type semiconductor, and electric current is considered to easily flow from the internal electrode layer 20 toward the dielectric particle 11 (second large particle 13b). At the existence location of the second large particle 13b, a circuit C1 shown in FIG. 4B is considered to be formed.

In the circuit C1, a Schottky diode SD-n1 corresponds with the junction interface B1, a resistance R1 corresponds with the second large particle 13b, and a Schottky diode SD-n2 corresponds with the junction interface B2. In the circuit C1, when electric current flows clockwise (i.e., the first internal electrode layer 21 is the positive electrode, and the second internal electrode layer 22 is the negative electrode), the Schottky diode SD-n2 at the junction interface B2 acts as a barrier and hinders the flow of electric current. On the other hand, when electric current flows counterclockwise (i.e., the first internal electrode layer 21 is the negative electrode, and the second internal electrode layer 22 is the positive electrode), the Schottky diode SD-n1 at the junction interface B1 acts as a barrier and hinders the flow of electric current. Thus, in the circuit C1, the resistance value hardly changes even if the direction of voltage is changed (the resistance value when electric current flows clockwise and the resistance value when electric current flows counterclockwise are approximately equal to each other). Since the circuit C1 as described above is formed at the existence location of the second large particle 13b, it is considered that the second large particle 13b does not contribute to the appearance of rectification action.

Figure 5A:
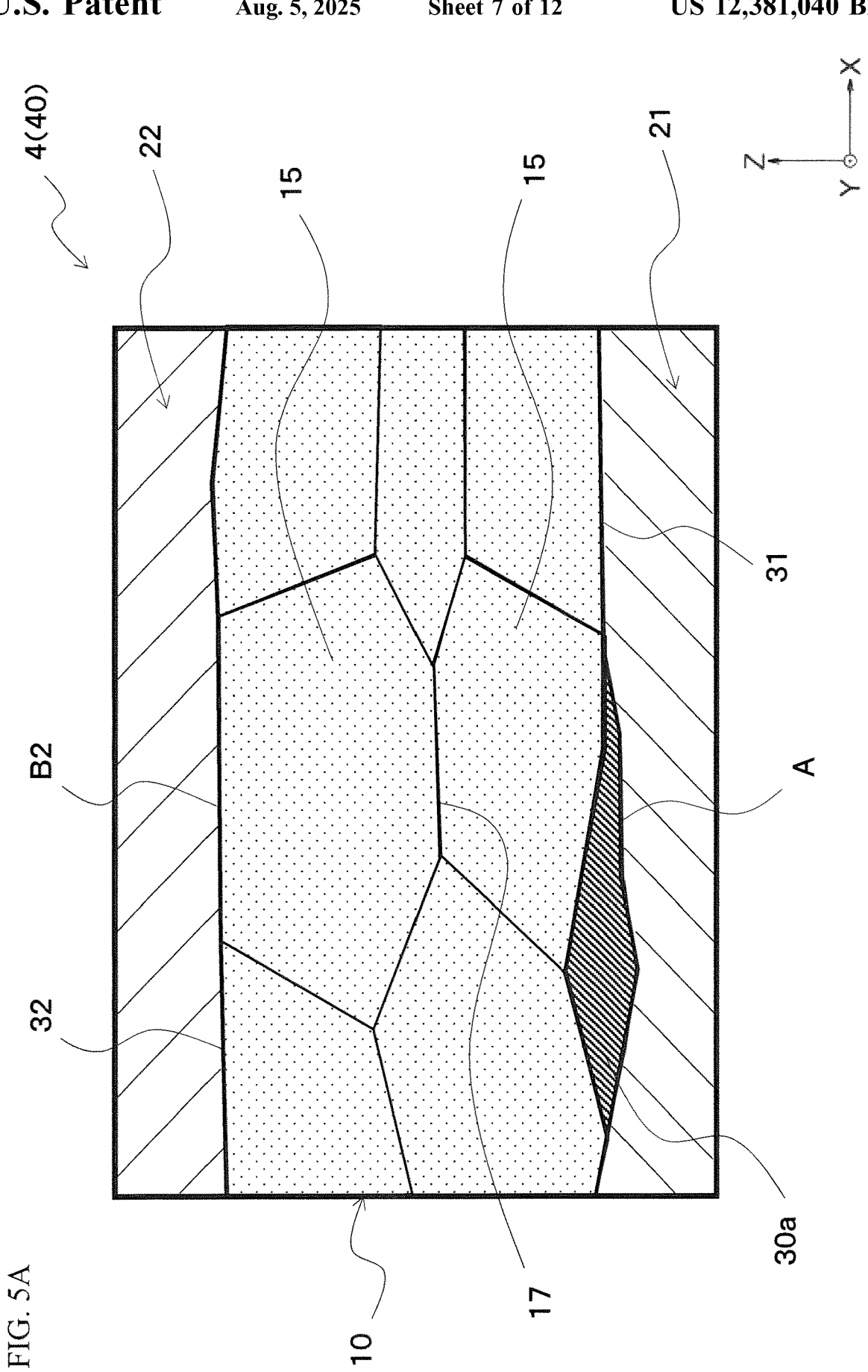
FIG. 5A is an enlarged schematic view of a part of a boundary between a dielectric layer and internal electrode layers.

FIG. 5A is an enlarged schematic view of a cross section of a location where the first Ni oxide particle 30a is not in contact with the first large particle 13a, but is in contact with the small particle 15. When the first Ni oxide particle 30a is in contact with the small particle 15, the grain boundary 17 exists between the small particle 15 in contact with the first Ni oxide particle 30a and the small particle 15 in contact with the second internal electrode layer 22. A double Schottky barrier is considered to occur in the grain boundary 17 between the small particles 15. At the contact portion between the first Ni oxide particle 30a and the small particle 15, it is considered that a circuit C2 shown in FIG. 5B is formed by the double Schottky barrier of the grain boundary 17.

Figure 5B:
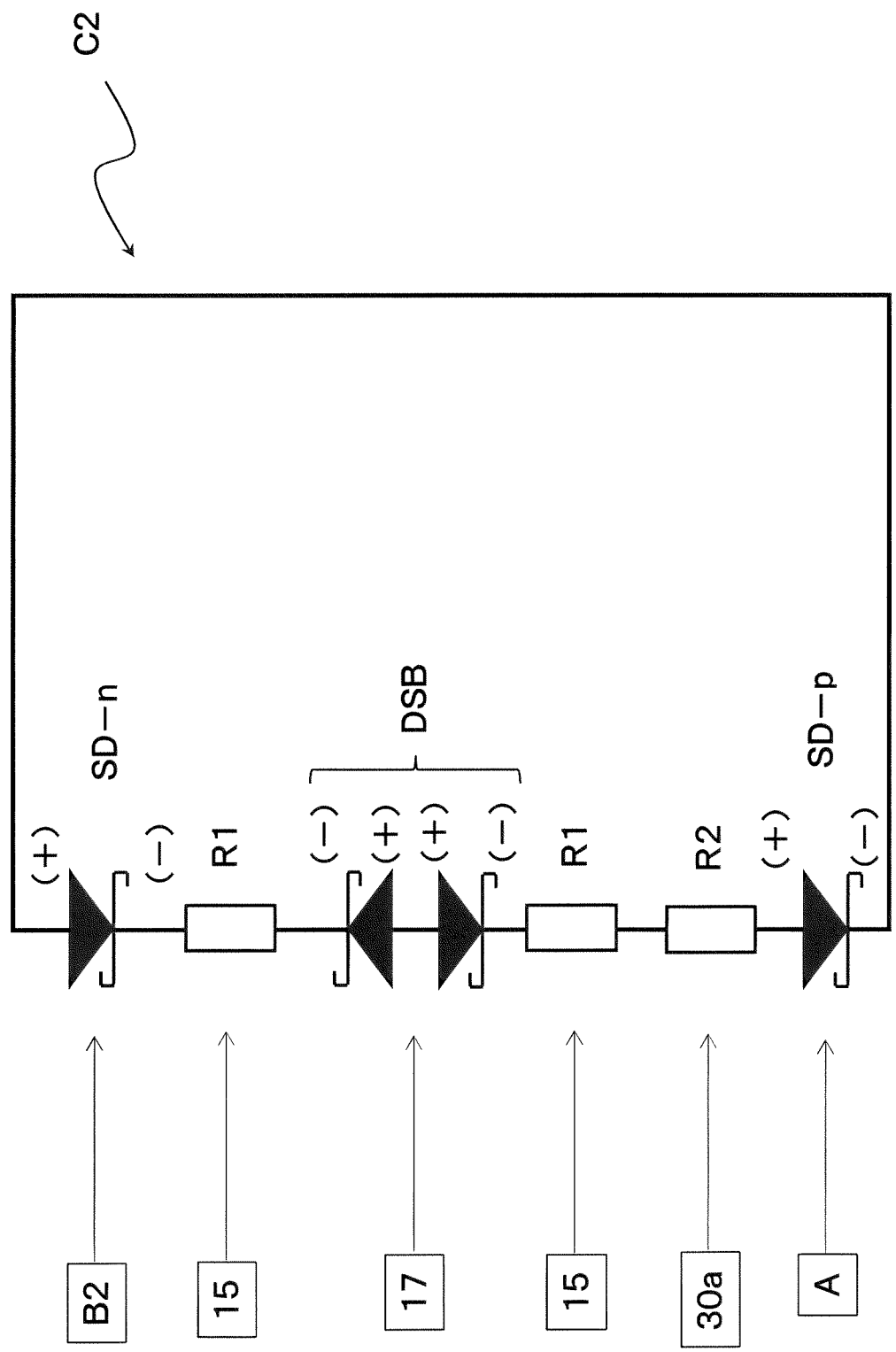
FIG. 5B is a conceptual view illustrating a circuit relating to the structure shown in FIG. 5A.

As shown in FIG. 5B, a double Schottky barrier DSB in the circuit C2 corresponds with the grain boundary 17. In the circuit C2, both of when electric current flows clockwise and when electric current flows counterclockwise, the double Schottky barrier DSB hinders the flow of electric current, and the resistance value hardly changes even if the direction of voltage is changed. Thus, it is considered that the small particles 15 and the grain boundaries 17 do not contribute to the appearance of rectification action.

Note that, the capacitance region 40 of the multilayer ceramic electronic device 2 includes a plurality of dielectric layers 10, a plurality of first internal electrode layers 21, and a plurality of second internal electrode layers 22, and a plurality of first boundaries 31 exists. When a cross section of the capacitance region 40 along the Z-axis direction is observed, the Ni oxide particle 30 exists at least in one first boundary 31. In other words, the capacitance region 40 may include the first internal electrode layer 21 and the dielectric layer 10 not in contact with the first Ni oxide particle 30a. Also, the capacitance region 40 may include a region containing the first Ni oxide particle 30a and a region not containing the first Ni oxide particle 30a. In this case, the region containing the first Ni oxide particle 30a is considered to be a region that highly contributes to the rectification action.

The ratio (E1/E0) of E1 to E0 is preferably 10% or more, more preferably 20% or more, where E0 is a total number of first internal electrode layers 21 contained in the capacitance region 40, and E1 is a number of first internal electrode layers 21 in contact with the first Ni oxide particles 30a among the total number E0.

LE is defined as a total length of the first internal electrode layers 21 and the second internal electrode layers 22 observed in a cross section of the capacitance region 40 as shown in FIG. 2. In the range of the total length LE, $NP_L$ is defined as a number of Ni oxide particles 30 in contact with the first internal electrode layers 21 or the second internal electrode layers 22. The average number of Ni oxide particles 30 in contact with the internal electrode layers 20 per unit length can be represented by a ratio of $NP_L$ to LE, and $NP_L$/LE is preferably 0.002 particles/μm or more, more preferably 0.005 particles/μm or more. When $NP_L$/LE is determined within the above-mentioned range, it is possible to increase the difference between the resistance value in one direction and the resistance value in the other direction, and the rectification action can be further enhanced.

The upper limit of $NP_L$/LE is not limited. For example, $NP_L$/LE is preferably 0.05 particles/μm or less, and a high capacitance can thereby be obtained. Note that, in the calculation of $NP_L$/LE, it is preferable to analyze a cross section of the capacitance region 40 for 500 μm² or more, and the total length LE is preferably set to 500 μm or more. Moreover, the analysis field of view is preferably determined so that the edge of a part of the analysis field of view is substantially parallel to the internal electrode layers 20. In this case, the length of the edge of the analysis field of view substantially parallel to the internal electrode layers 20 can be regarded as the length of the internal electrode layers 20 in this analysis field of view. For example, in the cross section shown in FIG. 2, the total length LE of the internal electrode layers 20 corresponds with $4L_X$ (four times the edge length $L_X$). Since seven Ni oxide particles 30 exist in the cross section of FIG. 2, $NP_L$/LE calculated in the cross section of FIG. 2 is $7/4L_X$ (particles/μm).

The above-mentioned $NP_L$ corresponds with the total number of first Ni oxide particles 30a and second Ni oxide particles 30b, but from the viewpoint of enhancing the rectification action, the number of first Ni oxide particles 30a and the number of first large particles 13a in the dielectric layers 10 are considered to be particularly important.

In a cross section as shown in FIG. 2, an average ratio (NP1/NP0) of NP1 to NP0 is preferably 0.6 or more, more preferably 0.75 or more, where NP0 is a total number of Ni oxide particles 30, and NP1 is a number of first Ni oxide particles 30a. That is, preferably, the Ni oxide particles 30 are concentrated on one pole. When NP1/NP0 is set to 0.6 or more, the rectification action can be further enhanced. The upper limit of NP1/NP0 is not limited, and all of the Ni oxide particles 30 observed in the cross section may exist at the first boundary 31 (i.e., NP1/NP0=1.0). In the calculation of NP1/NP0, it is preferable to analyze the cross section of the capacitance region 40 for 200 μm² or more.

Preferably, each of the first internal electrode layers 21 is in contact with two or more first Ni oxide particles 30a (more preferably, three or more first Ni oxide particles 30a) on average in one cross section of the capacitance region 40 along the Z-axis direction. That is, in one cross section of the element body 4 as shown in FIG. 1, an average number $AN_P$ of first Ni oxide particles 30a in contact with each of the first internal electrode layers 21 (the first internal electrode layers 21 per layer) is preferably two or more, more preferably three or more. When $2 \leq AN_P$ is satisfied, it is possible to further increase the difference between the resistance value in one direction and the resistance value in the other direction, and the rectification action can be further enhanced. Note that, $AN_P$ is calculated by measuring the number of first Ni oxide particles 30a in contact with each of the first internal electrode layers 21 having a length L1 in a cross section as shown in FIG. 1.

Preferably, each of the dielectric layers 10 includes two or more first large particles 13a on average in one cross section of the capacitance region 40 along the Z-axis direction. That is, preferably, the average number of first large particles 13a contained in dielectric layers 10 per layer is two or more. Also, the average number of first large particles 13a contained in the dielectric layers 10 per unit length can be represented as ND1/LD, where LD is a total length of the dielectric layers 10 observed in the cross section of the capacitance region 40, and ND1 is a number of first large particles 13a contained in the dielectric layers 10 having the total length LD. Preferably, ND1/LD is 0.005 particles/μm or more. When the first large particles 13a in contact with the first Ni oxide particles 30a are contained in the dielectric layers 10 at the above-mentioned ratio, the rectification action can be further enhanced.

Note that, in the calculation of ND1/LD, as in the case of $NP_L$/LE, it is preferable to analyze the cross section of the capacitance region 40 for 500 μm² or more, and the total length LD is preferably set to 500 μm or more. Also, the upper limit of ND1/LD is not limited, and ND1/LD is preferably, for example, 2 particles/μm or less.

Figure 6:
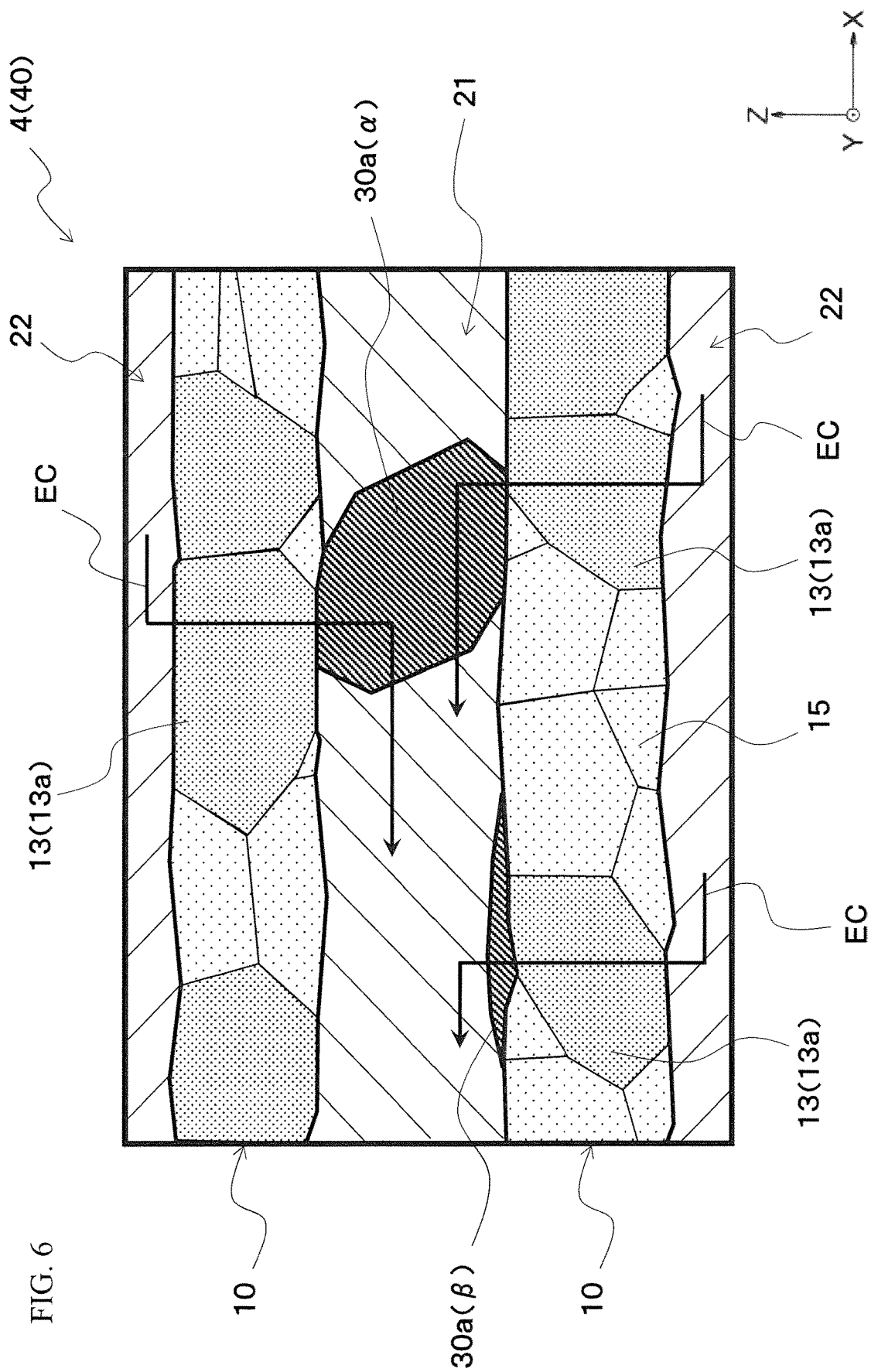
FIG. 6 is a schematic view illustrating a modified example of Ni oxide particles.

Preferably, the capacitance region 40 includes α-type first Ni oxide particles 30a, which are indicated by reference numeral "30a(α)" in FIG. 6. Each of the α-type first Ni oxide particles 30a is in contact with both of two dielectric layers 10 next to each other via the first internal electrode layer 21. That is, the α-type first Ni oxide particles 30a exist so as to penetrate the front and back surfaces of the first internal electrode layers 21 in a cross section of the capacitance region 40. Note that, preferably, the α-type first Ni oxide particles 30a are not in contact with the second internal electrode layers 22.

Also, in the present embodiment, the first Ni oxide particles 30a indicated by reference numeral "30a(β)" in FIG. 6 are referred to as β-type first Ni oxide particles 30a". Each of the β-type first Ni oxide particles 30a is in contact with only either one of two dielectric layers 10 next to each other via the first internal electrode layer 21.

As shown in FIG. 6, the α-type first Ni oxide particles 30a can be in contact with more first large particles 13a than the β-type first Ni oxide particles 30a. That is, it is considered that the α-type first Ni oxide particles 30a can form more equivalent circuits EC than the β-type first Ni oxide particles 30a. Thus, when the capacitance region 40 includes the α-type first Ni oxide particles 30a, the rectification action can be further enhanced.

In the cross section as shown in FIG. 2, NPβ<NPα is preferably satisfied, where NPα is a number of α-type first Ni oxide particles 30a, and NPβ is a number of β-type first Ni oxide particles 30β. That is, preferably, when the first Ni oxide particles 30a are classified into α-type and β-type based on the mode of the first Ni oxide particles 30a observed in the cross section of the element body, the first Ni oxide particles 30a mainly include α-type first Ni oxide particles 30a. Note that, in the measurement of NPα and NPβ, it is preferable to analyze a cross section of the capacitance region 40 for 200 μm² or more as in the case of NP1/NP0.

The average particle size $d_P$ of the Ni oxide particles 30 is not limited and is preferably 0.03 μm or more and 1.5 μm or less, more preferably 0.05 μm or more and 1 μm or less, for example. Also, preferably, the average particle size $d_P$ of the Ni oxide particles 30 is larger than the average particle size $d_M$ of the metal crystals contained in the internal electrode layers 20. Specifically, preferably, the ratio ($d_P$/$d_M$) of $d_P$ to $d_M$ is three or more, which makes it possible to further enhance the rectification action. Note that, the upper limit of $d_P$/$d_M$ is not limited, and $d_P$/$d_M$ can be 10 or less, for example. Also, preferably, the average particle size $d_P$ of the Ni oxide particles 30 is calculated by observing a cross section of the capacitance region 40 and measuring equivalent circle diameters of at least five Ni oxide particles 30.

Next, an example of a method of manufacturing a multilayer ceramic electronic device 2 shown in FIG. 1 is described.

First, a dielectric paste and an internal-electrode paste are prepared. The dielectric paste can be produced by adding a dielectric raw material powder (main component powder) and a subcomponent powder to a known organic vehicle or a known aqueous vehicle and kneading them. In addition to the above, a dispersant, a plasticizer, glass frit, etc. may be added to the dielectric paste. On the other hand, the internal-electrode paste can be produced by adding a metal powder, such as Ni powder, and a NiO powder to a known organic vehicle or a known aqueous vehicle and kneading them. A dielectric material powder may be added as an inhibitor to the internal-electrode paste. A dispersant, a plasticizer, etc. may be added to the internal-electrode paste.

Here, the NiO powder added to the internal-electrode paste is the raw material of the Ni oxide particles 30. $NP_L/LE$, NP1/NP0, $AN_p$, $NP\alpha$, $NP\beta$, and the like mentioned above can be controlled based on the mixing ratio of the NiO powder in the internal-electrode paste, the particle size of the NiO powder, the thickness of the internal electrode layers 20, and the like. The first internal electrode layers 21 and the second internal electrode layers 22 may be formed using the same internal-electrode paste. In order to selectively allow the Ni oxide particles 30 to exist at the first boundaries 31, however, it is preferable to prepare a first internal-electrode paste and a second internal-electrode paste.

For example, in the first internal-electrode paste, the NiO powder preferably has an average particle size of 0.03 μm or more and more preferably has an average particle size of 0.05 μm or more and 0.8 μm or less. Also, the mixing ratio of the NiO powder in the first internal-electrode paste is preferably 10 parts by weight or more and 25 parts by weight or less, more preferably 15 parts by weight or more and 20 parts by weight or less, with respect to 100 parts by weight of the metal powder. On the other hand, the mixing ratio of the NiO powder in the second internal-electrode paste is preferably 10 parts by weight or less, more preferably 5 parts by weight or less, with respect to 100 parts by weight of the metal powder. No NiO powder may be added to the second internal-electrode paste. When a NiO powder is added to the second internal-electrode paste, the average particle size of the NiO powder in the second internal-electrode paste is not limited and is preferably 0.8 μm or less, for example. Note that, both of the metal powders used for the first internal-electrode paste and the second internal-electrode paste preferably have an average particle size of 0.8 μm or less and more preferably have an average particle size of 0.03 μm or more and 0.5 μm or less.

ND/LD, ND1/LD, and the like relating to the large particles 13 of the dielectric layers 10 can be controlled based on the particle size of the dielectric raw material powder, the thickness of the dielectric layers 10, and the like. For example, the average particle size of the dielectric raw material powder is preferably 0.05 μm or more, more preferably 0.06 μm or more and 0.2 μm or less.

Next, the dielectric paste is sheeted by a method, such as a doctor blade method, to obtain green sheets. The average thickness $T_{DL}$ of the dielectric layers 10 can be controlled by the thicknesses of the green sheets, and the average thickness of the green sheets is preferably 2 μm or less, more preferably 0.2 μm or more and 1 μm or less. Then, the internal-electrode paste is applied in a predetermined pattern onto the green sheets by various printing methods, such as screen printing and a transfer method. The average thickness $T_{EL}$ of the internal electrode layers 20 can be controlled by the thickness of the internal-electrode paste applied on the green sheets. The thickness of the internal-electrode paste is preferably 2 μm or less, more preferably 0.2 μm or more and 1 μm or less.

Next, a mother laminate is obtained by laminating a plurality of green sheets applied with the internal-electrode paste and then pressing them in the lamination direction. In order to selectively allow the Ni oxide particles 30 to exist at the first boundaries 31, first green sheets applied with the first internal-electrode paste and second green sheets applied with the second internal-electrode paste are prepared, and the first green sheets and the second green sheets are laminated alternately. When a region that does not include the Ni oxide particles 30 in the capacitance region 40, third green sheets applied with an internal-electrode paste that does not contain NiO are prepared, and formed are a region in which the first green sheets and the second green sheets are laminated alternately and a region in which the third green sheets are laminated.

Note that, one or more green sheets that are not applied with the internal-electrode paste are laminated on the uppermost part and the lowermost part of the mother laminate in the lamination direction. When green sheets that are not applied with the internal-electrode paste are laminated in such a manner, the exterior regions 41 can be formed above and below the capacitance region 40.

A plurality of green chips is obtained by cutting the mother laminate obtained by the above-mentioned steps into a predetermined size by dicing or press-cutting. If necessary, the green chips may be dried for removing the plasticizer and the like and may be subjected to barrel polishing using a horizontal centrifugal barrel machine or the like after drying.

Next, the green chips obtained above are subjected to a binder removal treatment and a firing treatment to obtain the element body 4.

The conditions for the binder removal treatment are not limited and are appropriately determined based on the types of binders contained in the dielectric paste and the internal-electrode paste. For example, the heating rate is preferably 5 to 300° C./hour, the holding temperature is preferably 180 to 400° C., and the temperature holding time is preferably 0.5 to 24 hours. The atmosphere for the binder removal treatment can be an atmospheric atmosphere (i.e., in the air) or a reducing atmosphere and is preferably an atmospheric atmosphere.

The conditions for the firing treatment are not limited and are appropriately determined based on the composition of the main component of the dielectric layers 10 and the metal component of the internal electrode layers 20. For example, the holding temperature during firing is preferably 1200 to 1350° C., more preferably 1220 to 1300° C., and the holding time during firing is preferably 0.05 to 8 hours, more preferably 0.1 to 3 hours. The firing atmosphere is preferably a reducing atmosphere, and for example, a mixed gas of $N_2$ and $H_2$ can be humidified and used as the atmosphere gas. Moreover, when the internal electrode layers 20 are composed of a base metal such as Ni and Ni alloy, the oxygen partial pressure in the firing atmosphere is preferably $1.0 \times 10^{-14}$ MPa to $1.0 \times 10^{-10}$ MPa.

An annealing treatment may be performed on the element body 4 after firing. For example, an annealing treatment is preferably performed for reoxidation of the dielectric layers 10 or for removal of strain generated by firing. The conditions for the annealing treatment are not limited and are appropriately determined based on the composition of the main component of the dielectric layers 10 and the like. For example, the holding temperature is preferably 650 to 1150° C., the temperature holding time is preferably 0 to 20 hours, and the heating rate and the cooling rate are preferably 50 to 500° C./hour. As the atmosphere gas, it is preferable to use a dry $N_2$ gas, a humidified $N_2$ gas, or the like.

In order to humidify the $N_2$ gas, the mixed gas, and the like in the binder removal treatment, the firing treatment, and the annealing treatment, for example, a wetter or the like is used. In this case, the water temperature is preferably about 5 to 75° C. The binder removal treatment, the firing treatment, and the annealing treatment may be performed continuously or independently.

Note that, the end surfaces 4a and 4b of the element body 4 may be polished before the external electrodes 6 are formed. Polishing methods include, for example, barrel polishing, sandblasting, laser, and the like. When the end surfaces 4a and 4b of the element body 4 are polished, the internal electrode layers 20 and the external electrodes 6 are easily electrically connected.

Next, a pair of external electrodes 6 is formed on the outer surface of the element body 4. The method of forming the external electrodes 6 is not limited and is a known method. Through the above-described steps, the multilayer ceramic electronic device 2 shown in FIG. 1 is obtained.

After manufacturing the multilayer ceramic electronic device 2 or before using it (before incorporating the multilayer ceramic electronic device 2 into a circuit), a screening test is performed so as to determine the direction of rectification action. In the multilayer ceramic electronic device 2, the resistance value changes according to the application direction of voltage due to the rectification action, but the direction of the rectification action cannot be determined only by observing the external appearance of the multilayer ceramic electronic device 2. Thus, in the screening test, a direct current voltage is applied to the multilayer ceramic electronic device 2 so as to determine the direction in which the resistance value is lower and the direction in which the resistance value is higher. In the present embodiment, the direction in which the resistance is lower is defined as the "forward direction," and the direction in which the resistance is higher is defined as the "reverse direction."

$R_{Low}$ is defined as a resistance value when voltage is applied to the multilayer ceramic electronic device 2 in the forward direction, and $R_{High}$ is defined as a resistance value when voltage is applied to the multilayer ceramic electronic device 2 in the reverse direction. In the multilayer ceramic electronic device 2, $R_{High}/R_{Low}$ is preferably 10 or more, more preferably 50 or more, and even more preferably 100 or more. Note that, considering the above-described hypothesis for the rectification action (the equivalent circuit EC shown in FIG. 3B), in the multilayer ceramic electronic device 2 of the present embodiment, it is considered that a low resistance value $R_{Low}$ is obtained when voltage is applied with the first internal electrode layer 21 side as the negative electrode and the second internal electrode layer 22 side as the positive electrode.

Figure 7:
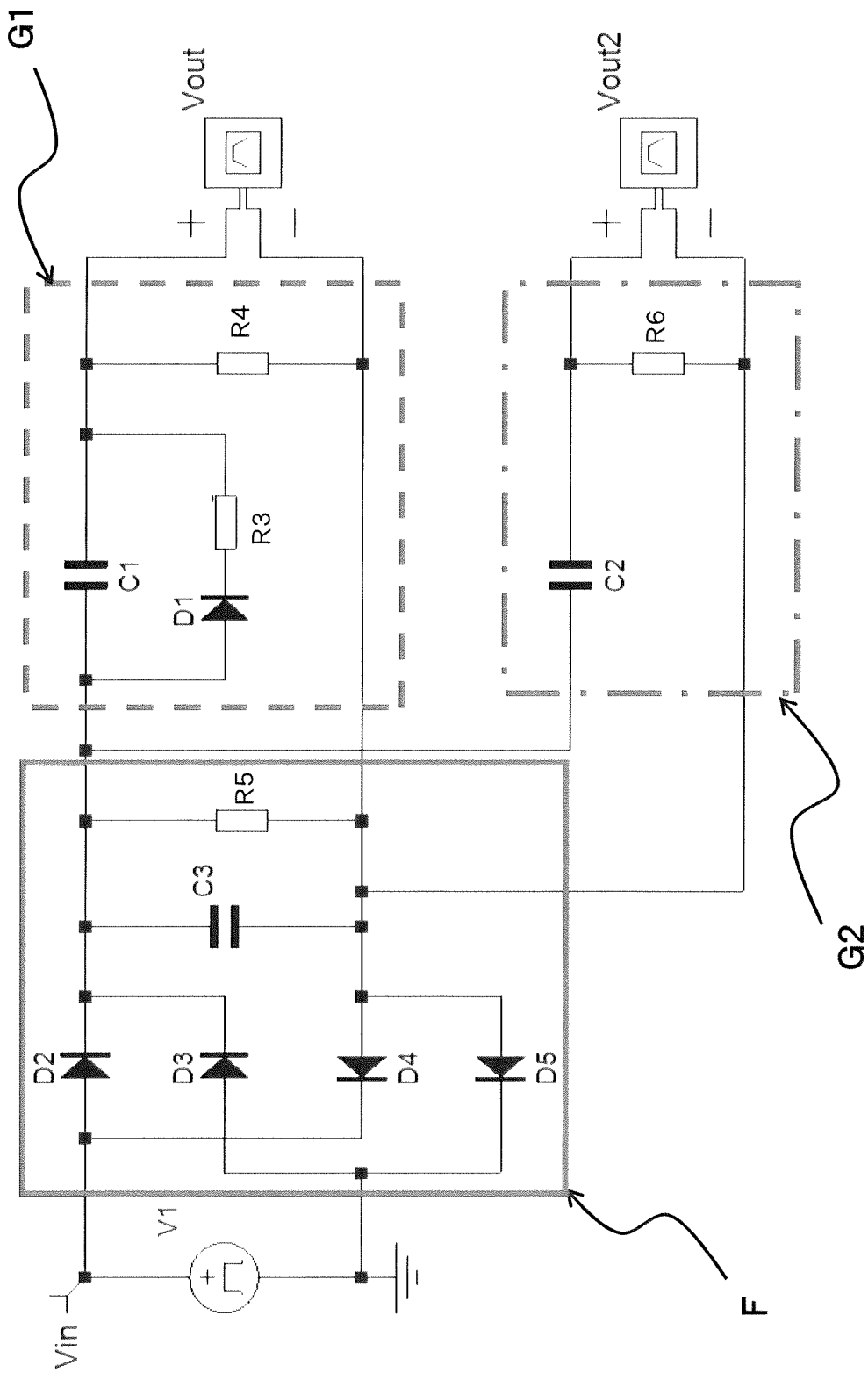
FIG. 7 is a circuit diagram illustrating an example of an AC/DC converter circuit.

The multilayer ceramic electronic device 2 of the present embodiment may be applicable to, for example, an AC/DC converter circuit as shown in FIG. 7. The AC/DC converter circuit of FIG. 7 is a rectifier circuit that converts alternating current to direct current. In FIG. 7, C1 to C3 are capacitors, R3 to R6 are resistances, and D1 to D5 are diodes.

Figure 8A:
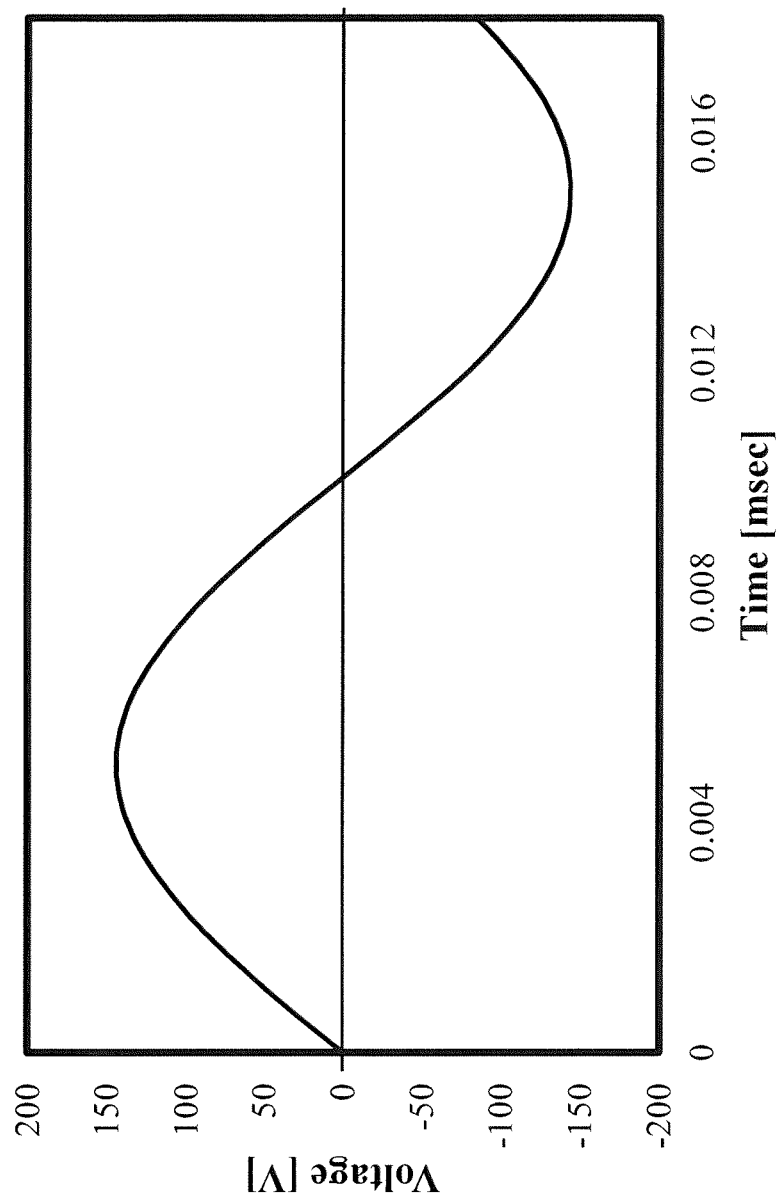
FIG. 8A is a graph illustrating an example of an AC voltage waveform input to the AC/DC converter circuit shown in FIG. 7.

A circuit F surrounded by the thick line in FIG. 7 is a full-wave rectifier circuit including a bridge by four diodes D2 to D5. When an AC voltage having a voltage waveform as shown in FIG. 8A is input to this circuit F, a negative voltage component is converted into a positive voltage. On the other hand, both of a circuit G1 surrounded by the broken line and a circuit G2 surrounded by a dashed line in FIG. 7 are circuits that divide the full-wave rectified voltage output from the circuit F and reduce the voltage value. The circuit G1 includes the capacitor C1, the diode D1, the resistance R3, and the resistance R4, and these three types of electronic components divide the full-wave rectified voltage. On the other hand, the circuit G2 includes the capacitor C2 and the resistance R6, and these two types of electronic components divide the full-wave rectified voltage.

Figure 8B:
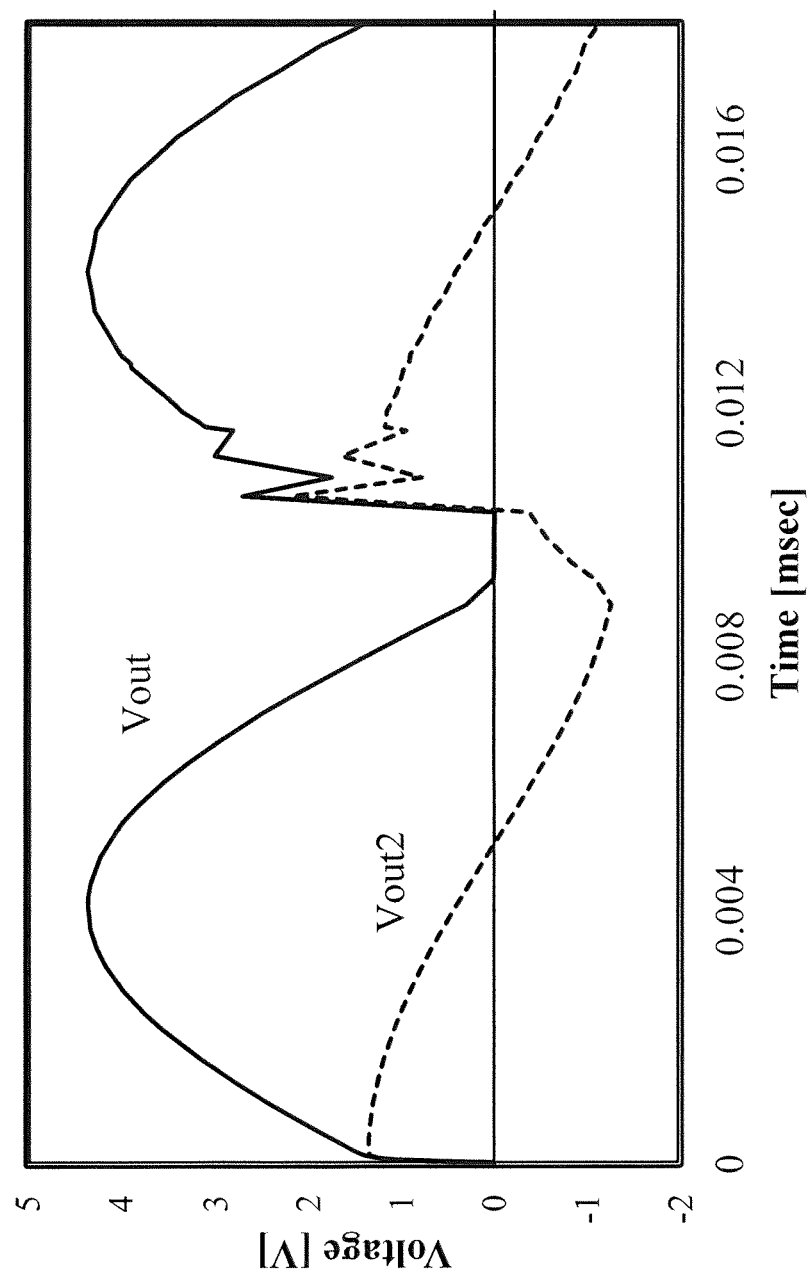
FIG. 8B is a graph illustrating an example of a voltage waveform output from the AC/DC converter circuit shown in FIG. 7.

The graph indicated by the solid line in FIG. 8B is a waveform of the voltage Vout after voltage division output from the circuit G1, and the graph indicated by the broken line in FIG. 8B is a waveform of the voltage Vout2 after voltage division output from the circuit G2. In the case of the circuit G2 dividing the voltage by two types of capacitor and resistance, as shown in FIG. 8B, the phases of the voltage waveforms are shifted, and a negative voltage is generated. On the other hand, in the case of the circuit G1 dividing the voltage by three types of capacitor, diode, and resistance, it is possible to prevent both phase shift and generation of negative voltage. Also, the rise of the voltage output from the circuit G1 from 0 V corresponds with the zero crossing (zero point) of the input AC voltage (FIG. 8A). Note that, for example, when the capacitor C1 of the circuit G1 is replaced with a resistance (not shown), the circuit G1 becomes a normal voltage dividing circuit. In this case, a loss is generated in this resistance (not shown). In the circuit G1, since the capacitor C1 is employed, not a resistance (not shown), the loss is only a tan δ component of the capacitor C1 and reduced.

In the AC/DC converter circuit, if the types of components are reduced as in the circuit G2, it generally becomes difficult to normally divide the voltage, and it is thus not easy to simplify the circuit. The multilayer ceramic electronic device 2 of the present embodiment functions as a capacitor (i.e., electric charges can be stored in the dielectric layers 10) and has a rectification action like a diode. Thus, the three types of electronic components (capacitor, diode, and resistance) included in the circuit G1 can be substituted by one type of multilayer ceramic electronic device 2, and there is a possibility that the circuit can be simplified. Note that, when one type of multilayer ceramic electronic device 2 is substituted for the capacitor, the diode, and the resistances of the circuit G1, a plurality of multilayer ceramic electronic devices 2 may be connected in series in order to ensure a sufficient withstand voltage.

(Summary of Embodiment)

The multilayer ceramic electronic device 2 of the present embodiment includes the first internal electrode layers 21, the second internal electrode layers 22, and the dielectric layers 10 laminated between the first internal electrode layers 21 and the second internal electrode layers 22. The capacitance region 40 of the element body 4 includes the first Ni oxide particles 30a existing at the first boundaries 31 between the first internal electrode layers 21 and the dielectric layers 10. Then, the dielectric layers 10 include the first large particles 13a in contact with the first Ni oxide particles 30a at the first boundaries 31 and with the second internal electrode layers 22.

As described above, since the multilayer ceramic electronic device 2 includes the capacitance region 40 in which the first internal electrode layers 21, the second internal electrode layers 22, and the dielectric layers 10 are laminated, electric charges can be stored in the dielectric layers 10. That is, the multilayer ceramic electronic device 2 functions as a capacitor. For conventional multilayer ceramic capacitors, it has been considered favorable to have a high resistance value (see Patent Document 1). On the other hand, the multilayer ceramic electronic device 2 of the present embodiment obtains a rectification action in which a resistance value in the forward direction is lower than a resistance value in the reverse direction (specifically, a rectification action in which $R_{High}/R_{Low}$ is 10 or more). The reason why the rectification action is obtained is not necessarily clear, but it is considered that two types of Schottky junctions are related to the appearance of the rectification action. Specifically, an equivalent circuit EC as shown in FIG. 3B is considered to be formed at each of the contact points between the first large particles 13a and the first Ni oxide particles 30a, and the equivalent circuit EC is considered to exhibit the rectification action.

Figure 3B:
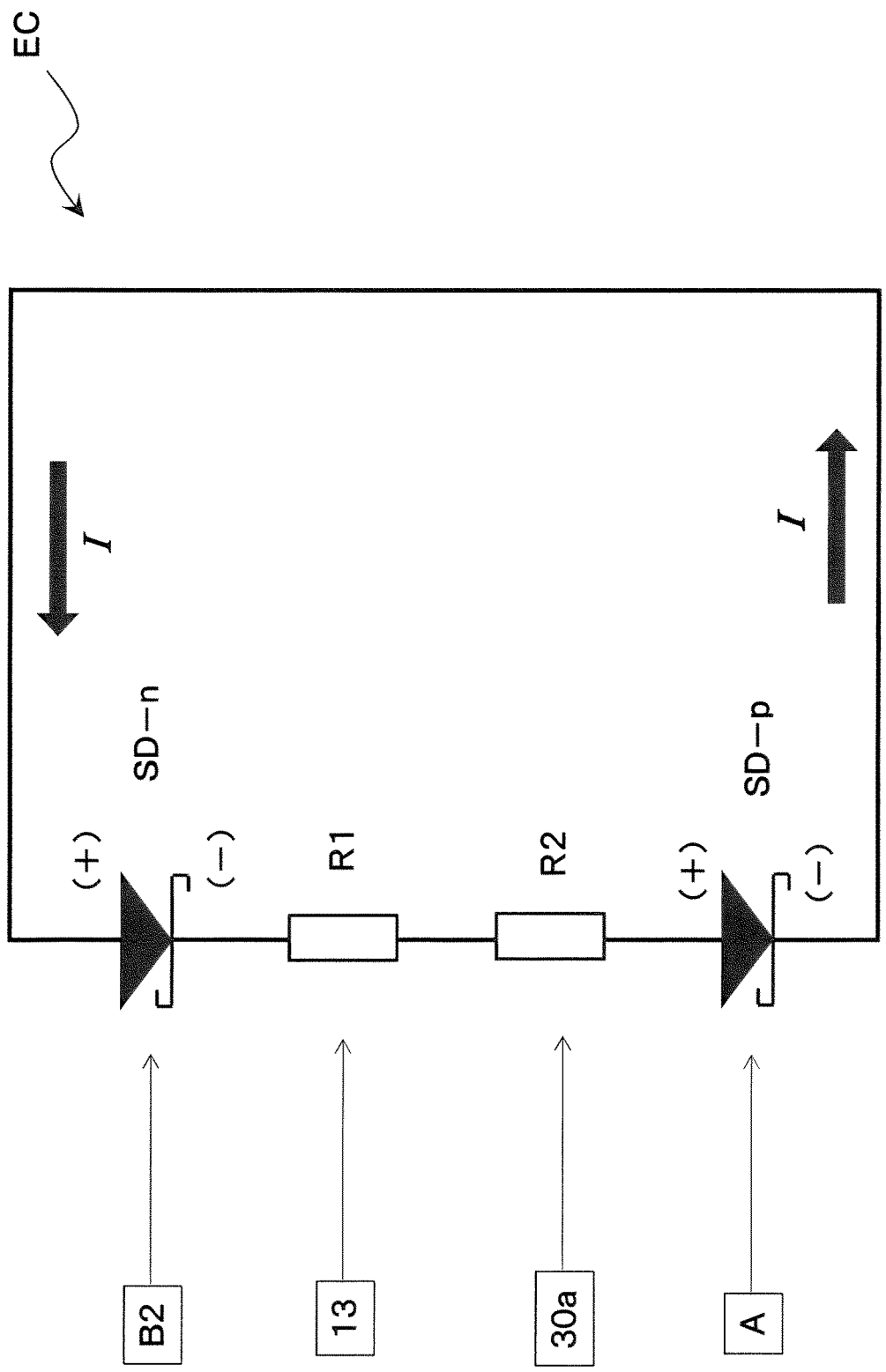
FIG. 3B is a conceptual view illustrating a circuit relating to the structure shown in FIG. 3A.

Note that, from the viewpoint of forming the equivalent circuit EC shown in FIG. 3B, it is sufficient that p-type semiconductor particles exist at the first boundaries 31 and are in contact with the first large particles 13a of the dielectric layers 10. That is, in FIG. 2 and FIG. 3A, the particles indicated by reference numeral "30a" are not necessarily limited to Ni oxide particles (NiO) and are enough to be p-type semiconductor particles.

Preferably, the capacitance region 40 of the element body 4 includes α-type first Ni oxide particles 30a in contact with two dielectric layers 10 next to each other via the first internal electrode layer 21. The α-type first Ni oxide particles 30a may be able to contact with more first large particles 13a than the other first Ni oxide particles 30a. That is, when the capacitance region 40 includes the α-type first Ni oxide particles 30a, the rectification action can be further enhanced ($R_{High}/R_{Low}$ can be larger).

Preferably, the average number $AN_P$ of first Ni oxide particles 30a in contact with each of the first internal electrode layers 21 is two or more. When the multilayer ceramic electronic device 2 satisfies this requirement, the rectification action can be further enhanced.

Preferably, NP1/NP0 is 0.6 or more, where NP0 is a total number of Ni oxide particles 30 observed in a cross section of the element body 4, and NP1 is a number of first Ni oxide particles 30a. When this requirement is satisfied, the rectification action can be further enhanced.

Preferably, the average number ($NP_L/LE$) of Ni oxide particles 30 in contact with the internal electrode layers 20 per unit length is 0.002 particles/μm or more. When the multilayer ceramic electronic device 2 satisfies this requirement, the rectification action can be further enhanced.

Preferably, $d_P/d_M$ is 3 or more, where $d_M$ is an average particle size of metal crystals contained in the internal electrode layers 20, and $d_P$ is an average particle size of the Ni oxide particles 30. When the multilayer ceramic electronic device 2 satisfies this requirement, the rectification action can be further enhanced.

Note that, when a cross section of the capacitance region 40 is analyzed so as to calculate $AN_P$ and NP1/NP0 described above, the first internal electrode layers 21 and the second internal electrode layers 22 are determined by any of the following three methods.

For example, when a cross section of the capacitance region 40 is observed, it may be confirmed that the internal electrode layers 20 in contact with the Ni oxide particles 30, the dielectric layers 10, and the internal electrode layers 20 not in contact with the Ni oxide particles 30 are repeatedly laminated in this stated order. In this case, among the pair of internal electrode layers 20 facing each other via the dielectric layer 10, the internal electrode layer 20 in contact with the Ni oxide particles 30 is determined as the first internal electrode layer 21, and the internal electrode layer 20 not in contact with the Ni oxide particles 30 is determined as the second internal electrode layer 22.

When both of the pair of internal electrode layers 20 are in contact with the Ni oxide particles 30, the internal electrode layer 20 in contact with more Ni oxide particles 30 is determined as the first internal electrode layer 21, and the other internal electrode layer 20 is determined as the second internal electrode layer 22.

The first internal electrode layers 21 and the second internal electrode layers 22 may be determined by performing a screening test before cross-sectional observation. For example, when a low resistance value $R_{Low}$ is obtained in a screening test, the positive electrode side is determined as the second external electrode 6b, and the negative electrode side is determined as the first external electrode 6a. Then, during cross-sectional observation, the internal electrode layer 20 connected to the first external electrode 6a may be determined as the first internal electrode layer 21, and the internal electrode layer 20 connected to the second external electrode 6b may be determined as the second internal electrode layer 22.

Hereinbefore, an embodiment of the present disclosure is described, but the present disclosure is not limited to the above-described embodiment at all and may variously be modified within the scope that does not deviate from the gist of the present disclosure.

For example, the external electrodes 6 may be pad-shaped electrodes existing on one side surface of the element body 4. In this case, the pad-shaped external electrodes 6 may be electrically connected to the internal electrode layers 20 via through-hole electrodes or via-hole electrodes.

It is sufficient that the electronic device of the present disclosure includes at least one first internal electrode layer 21, at least one second internal electrode layer 22, and at least one dielectric layer 10, and the electronic device of the present disclosure is not limited to the multilayer ceramic electronic device 2 as shown in FIG. 1.

EXAMPLES

Hereinafter, the present disclosure is described based on more detailed examples, but the present disclosure is not limited to these examples.

Experiment 1

In Experiment 1, multilayer ceramic electronic devices according to Example A1, Comparative Example 1, and Comparative Example 2 were manufactured in the following procedure.

Example A1

First, a dielectric paste as a raw material for dielectric layers was prepared using a (Ba,Ca)(Ti,Zr)O$_3$ powder (main component powder) having an average particle size of 0.09 μm and subcomponent powders ($MgCO_3$ powder, $Y_2O_3$ powder, $MnCO_3$ powder, $V_2O_5$ powder, and $SiO_2$ powder). Also, as raw materials for internal electrode layers, a first internal-electrode paste and a second internal-electrode paste were prepared. A Ni powder having an average particle size of 0.18 μm and a NiO powder having an average particle size of 0.15 μm were added to the first internal-electrode paste. The mixing ratio of the NiO powder in the first internal-electrode paste was 17 parts by weight with respect to 100 parts by weight of the Ni powder. On the other hand, a Ni powder having an average particle size of 0.18 μm was added to the second internal-electrode paste, and no NiO powder was added to the second internal-electrode paste.

Next, the dielectric paste was applied onto PET films and sheeted so as to obtain green sheets each having a thickness of 0.65 μm, and the first internal-electrode paste was thereafter applied onto these green sheets in a predetermined pattern so as to prepare first green sheets. Moreover, the dielectric paste was applied onto PET films and sheeted so as to obtain green sheets each having a thickness of 0.65 μm, and the second internal-electrode paste was thereafter applied onto these green sheets in a predetermined pattern so as to prepare second green sheets. Note that, the application amount of the first internal-electrode paste and the application amount of the second internal-electrode paste were controlled so that the average thickness $T_{EL}$ of the internal electrode layers after firing would be 0.55 μm.

Next, the first green sheets and the second green sheets were alternately laminated and pressed to obtain a mother laminate. At this time, the green sheets not applied with the internal-electrode paste were laminated on the uppermost part and the lowermost part of the mother laminate in the lamination direction. Also, the lamination numbers of first green sheets and second green sheet were controlled so that the lamination number of dielectric layers in the capacitance region was 350. Also, the thickness of each of exterior regions 41 after firing was controlled so as to be 20 μm or more.

After cutting the mother laminate into a predetermined size so as to obtain green chips, these green chips were subjected to a binder removal treatment, a firing treatment, and an annealing treatment. Then, an external electrode containing a sintered body whose main component was Cu was formed on each end surface of an element body. Through the above steps, a multilayer ceramic electronic device having a cross-sectional structure similar to that in FIG. 1 was obtained. The average size of the element body in this multilayer ceramic electronic device was L0×W0=0.7 mm×0.45 mm.

Comparative Example 1

In Comparative Example 1, both of first internal electrode layers and second internal electrode layers were formed using an internal-electrode paste containing no NiO powder. Specifically, in Comparative Example 1, an internal-electrode paste was prepared using a Ni powder having an average particle size of 0.18 μm, and no NiO powder was added to this internal-electrode paste. Then, the internal-electrode paste was applied in a predetermined pattern onto green sheets each having a thickness of 0.65 μm so as to obtain first green sheets and second green sheets. Note that, in Comparative Example 1, the same dielectric paste as in Example A1 was used, and the thickness of each of the green sheets was controlled to the same extent as in Example A1. A multilayer ceramic electronic device according to Comparative Example 1 was manufactured under the same manufacturing conditions as in Example A1 except for those described above.

Comparative Example 2

In Comparative Example 2, first internal electrode layers and second internal electrode layers were formed using the same first internal-electrode paste and the same second internal-electrode paste as in Example A1. In Comparative Example 2, however, dielectric layers were formed under conditions different from those in Example A1. Specifically, in Comparative Example 2, a dielectric paste containing a $(Ba,Ca)(Ti,Zr)O_3$ powder (main component powder) having an average particle size of 0.04 μm was prepared, and green sheets each having a thickness of 0.65 μm was produced using this dielectric paste. As described above, the $(Ba,Ca)(Ti,Zr)O_3$ powder employed in Comparative Example 2 had an average particle size different from that in Example A1, but the subcomponent powder added to the dielectric paste and the mixing ratio of the subcomponent powder were the same as those in Example A1. A multilayer ceramic electronic device according to Comparative Example 2 was manufactured under the same manufacturing conditions as in Example A1 except for those described above.

Cross-Sectional Analysis of Element Body

A cross section of the element body in the lamination direction (a cross section of the capacitance region as shown in FIG. 1 and FIG. 2) was observed with a STEM, and an average thickness $T_{EL}$ (μm) of the internal electrode layers, an average thickness $T_{DL}$ (μm) of the dielectric layers, and an average particle size dim (μm) of the dielectric particles contained in the dielectric layers were measured. In this cross-sectional observation, an elemental mapping analysis by EDS was performed in five analysis fields of view (area of each analysis field of view: 54 μm$^2$) so as to determine whether or not Ni oxide particles were present within the analysis range. "Y" and "N" are described in the column of "Existence of Ni Oxide Particles" in Table 1. "Y" means that Ni oxide particles were present at the boundaries between the dielectric layers and the internal electrode layers, and "N" means that no Ni oxide particles were observed at the boundaries between the dielectric layers and the internal electrode layers.

Moreover, in the samples in which the Ni oxide particles were observed by the above cross-sectional analysis, among a pair of internal electrode layers facing each other via the dielectric layer, the internal electrode layer in contact with more Ni oxide particles was determined as a first internal electrode layer, and the internal electrode layer in contact with fewer Ni oxide particles was determined as a second internal electrode layer.

Moreover, in the above cross-sectional analysis, dielectric particles in contact with the Ni oxide particles at the boundary with one internal electrode layer (first boundary 31) and in contact with the metal component of the internal electrode layers at the boundary with the other internal electrode layer (second boundary 32) were determined as first large particles (13a). In the column of "Existence of First Large Particles" of Table 1, "Y" means that the first large particles 13a were contained in the dielectric layers 10, and "N" means that the first large particles 13a were not contained in the dielectric layers 10.

Evaluation for Rectification Action

A DC voltage of 4V was applied to the multilayer ceramic electronic device from any direction for 30 seconds, and a resistance value r1 of the multilayer ceramic electronic device at that time was measured. Moreover, the application direction of voltage was reversed, a DC voltage of 4V was again applied to the multilayer ceramic electronic device for 30 seconds, and a resistance value r2 of the multilayer ceramic electronic device at that time was measured. Among the resistance value r1 and the resistance value r2, the lower one was defined as $R_{Low}$, and the higher one was defined as $R_{High}$. Then, a ratio of $R_{High}$ to $R_{Low}$ (no units) was calculated.

In the present experiment, when $R_{High}/R_{Low}$ was 10 or more, "a measurement sample has a rectification action" was determined. With respect to rectification action, a sample having a $R_{High}/R_{Low}$ of 50 or more and less than 100 was determined as "good", and a sample having a $R_{High}/R_{Low}$ of 100 or more was determined as "particularly good".
Measurement for Capacitance In order to determine the existence of capacitor characteristics, a capacitance (g) of the multilayer ceramic electronic device was measured using an LCR meter. At this time, after setting the measurement temperature to room temperature (25° C.), a signal having a frequency of 1 kHz and an input signal level (measurement voltage) of 1 Vrms was input to the multilayer ceramic electronic device. In the present experiment, when the capacitance was 3.8 μF or more, "the measurement sample has a function of sufficiently accumulating electric charges as a capacitor" was determined.

Table 1 shows the evaluation results of Example A1, Comparative Example 1, and Comparative Example 2.

It was confirmed that the multilayer ceramic electronic device of Example A1 had a sufficient capacitance and had a function of storing electric charges in the dielectric layers as a capacitor. It was also confirmed that $R_{High}/R_{Low}$ of Example A1 was much larger than that of each of Comparative Examples 1 and 2, and that the multilayer ceramic electronic device of Example A1 had a diode-like rectification action.

Experiment 2

In Experiment 2, multilayer ceramic electronic devices according to Example B1 and Example B2 shown in Table 2 were manufactured, and the characteristics of each example were compared. Specifically, in Example B1, a first internal-electrode paste was produced using a NiO powder having a particle size smaller than that of Example A1. In Example B2, a first internal-electrode paste was prepared using a NiO powder having a particle size further smaller than that of Example B1. The manufacturing conditions other than the specifications of the NiO powder were the same as those in Example A1.

In the cross-sectional analysis of Experiment 2, after performing an elemental mapping analysis by EDS in five analysis fields of view (area of each analysis field of view: 54 μm$^2$) and determining Ni oxide particles existing at the boundaries between the dielectric layers and the internal

TABLE 1

| | Results of Cross-Sectional Analysis | | | | | | | |
|---|---|---|---|---|---|---|---|---|
| | Internal Electrode | Existence of Ni | Dielectric Layers | | | | | |
| Sample No. | Layers $T_{EL}$ (μm) | Oxide Particles | $T_{DL}$ (μm) | $d_{DP}$(μm) | $T_{DL}/d_{DP}$ | Existence of First Large Particles | $R_{High}/R_{Low}$ (—) | Capacitance (μF) |
| Comp. Ex. 1 | 0.54 | N | 0.55 | 0.59 | 0.93 | N | 1.5 | 4.01 |
| Comp. Ex. 2 | 0.55 | Y | 0.54 | 0.31 | 1.74 | N | 1.7 | 3.72 |
| Ex. A1 | 0.53 | Y | 0.55 | 0.58 | 0.95 | Y | 87 | 4.02 |

In Comparative Example 1, since the internal-electrode paste containing no NiO powder was used, Ni oxide particles did not exist at the boundaries between the dielectric layers and the internal electrode layers, and first large particles in contact with Ni oxide particles were not contained in the dielectric layers. In Comparative Example 2, Ni oxide particles were observed at the boundaries between the dielectric layers and the internal electrode layers. However, the dielectric layers of Comparative Example 2 hardly contained large particles (reference numeral: 13), and first large particles (reference numeral: 13a) in contact with the Ni oxide particles were not detected in the cross-sectional analysis of Comparative Example 2. That is, in Comparative Example 2, the Ni oxide particles in the capacitance region were in contact with small particles (reference numeral: 15) of the dielectric layers and were not in contact with the large particles.

On the other hand, in the cross-sectional analysis of Example A1, Ni oxide particles were observed at the boundaries between the dielectric layers and the internal electrode layers, and it was confirmed that first large particles in contact with the Ni oxide particles were present in the dielectric layers. That is, in Example A1, it was confirmed that a cross-sectional structure as shown in FIG. 3A was present in the capacitance region.

electrode layers in this analysis range, these Ni oxide particles were classified into "α-type" and "β-type". Then, the number NPα of α-type Ni oxide particles and the number NPβ of β-type Ni oxide particles were measured. Note that, the α-type Ni oxide particles were Ni oxide particles in contact with two dielectric layers next to each other via the internal electrode layer, and the β-type Ni oxide particles were Ni oxide particles in contact with either one of two dielectric layers next to each other via the internal electrode layer (see FIG. 6).

In the cross-sectional analysis of Experiment 2, an average particle size $d_M$ of metal crystals contained in the internal electrode layers and an average particle size $d_P$ of Ni oxide particles were measured, and a ratio of $d_P$ to $d_M$ (no units) was calculated.

In Example B1 and Example B2, similarly to Example A1, Ni oxide particles were observed at the boundaries between the dielectric layers and the internal electrode layers, and it was confirmed that the first large particles in contact with the Ni oxide particles were present in the dielectric layers. Table 2 shows the evaluation results of Experiment 2.

TABLE 2

| Sample No. | Results of Cross-Sectional Analysis Proportion of Ni Oxide Particles between α-type and β-type | $d_P/d_M$ (—) | $R_{High}/R_{Low}$ (—) | Capacitance (μF) |
|---|---|---|---|---|
| Ex. B1 | NPα < NPβ | 2.1 | 37 | 3.98 |
| Ex. B2 | NPα < NPβ | 3.2 | 55 | 4.03 |
| Ex. A1 | NPα > NPβ | 4.5 | 87 | 4.02 |

As shown in Table 2, $R_{High}/R_{Low}$ was larger in Example A1 (the ratio of α-type Ni oxide particles was higher) than in Example B1 (the ratio of α-type Ni oxide particles was lower). This result shows that the α-type Ni oxide particles contributed to the improvement in rectification action. Also, the results of Experiment 2 show that $d_P/d_M$ was preferably 3 or more.

Experiment 3

In Experiment 3, a NiO powder was added to each of a first internal-electrode paste and a second internal-electrode paste, and four types of multilayer ceramic electronic devices shown in Table 3 were manufactured. A Ni powder having an average particle size of 0.18 μm and a NiO powder having an average particle size of 0.2 μm were added to the first internal-electrode paste and the second internal-electrode paste, respectively, used in each of Examples C1 to C4 and the mixing ratio of the NiO powder in the first internal-electrode paste was higher than the mixing ratio of the NiO powder in the second internal-electrode paste. The conditions other than the mixing ratio of the NiO powder were the same as those in Example A1 of Experiment 1.

In the cross-sectional analysis of Experiment 3, among a pair of internal electrode layers facing each other via the dielectric layer, the internal electrode layer in contact with more Ni oxide particles was determined as a first internal electrode layer, and the internal electrode layer in contact with fewer Ni oxide particles was determined as a second internal electrode layer. At this time, a cross section of the element body (capacitance region) was analyzed by three fields of view, and the area of each analysis field of view was set to 54 μm². Then, a number NP0 of Ni oxide particles and a number NP1 of Ni oxide particles existing at the boundaries (first boundaries 31) between the first internal electrode layers and the dielectric layers were measured.

Note that, it was confirmed that, in Examples C1 to C4, as in Example A1, the first large particles in contact with the Ni oxide particles were present in the dielectric layers. Table 3 shows the evaluation results of Experiment 3.

TABLE 3

| Sample No. | Result of Cross-Sectional Analysis NP1/NP0 (—) | $R_{High}/R_{Low}$ (—) | Capacitance (μF) |
|---|---|---|---|
| Ex. C1 | 0.58 | 23 | 4.06 |
| Ex. C2 | 0.63 | 41 | 4.01 |
| Ex. C3 | 0.77 | 87 | 4.02 |
| Ex. C4 | 0.92 | 132 | 4.03 |

From the results of Table 3, it was found that NP1/NP0 is preferably 0.6 or more, more preferably 0.75 or more.

Experiment 4

In Experiment 4, multilayer ceramic electronic devices according to Examples D1 to D3 were manufactured by changing the mixing ratio of the NiO powder in the first internal-electrode paste. In each of Examples D1 to D3, a second internal-electrode paste containing no NiO powder was used (i.e., the specifications of the second internal-electrode paste were the same as those in Example A1). The manufacturing conditions other than the mixing ratio of NiO were the same as those in Example A1.

In the cross-sectional analysis of Experiment 4, among a pair of internal electrode layers facing each other via the dielectric layer, the internal electrode layer in contact with more Ni oxide particles was determined as a first internal electrode layer, and the internal electrode layer in contact with fewer Ni oxide particles was determined as a second internal electrode layer. Then, an average number $AN_P$ of Ni oxide particles in contact with each of the first internal electrode layers was measured.

The internal electrode layers having a total length of 920 μm or more contained in a cross section of 1134 μm² were analyzed to calculate an average number $NP_L/LE$ of Ni oxide particles in contact with the internal electrode layers per unit length. Note that, in Examples D1 to D3, similarly to Example A1, it was confirmed that first large particles in contact with the Ni oxide particles were present in the dielectric layers. Table 4 shows the evaluation results of Experiment 4.

TABLE 4

| Sample No. | Results of Cross-Sectional Analysis $AN_P$ | $NP_L/LE$ (μm⁻¹) | $R_{High}/R_{Low}$ (—) | Capacitance (μF) |
|---|---|---|---|---|
| Ex. D1 | 1.4 | 0.0011 | 34 | 3.92 |
| Ex. D2 | 2.3 | 0.0024 | 48 | 4.01 |
| Ex. D3 | 2.8 | 0.0030 | 52 | 4.01 |
| Ex. A1 | 3.3 | 0.0060 | 87 | 4.02 |

From the results of Table 4, it was found that $AN_P$ is preferably two or more, more preferably three or more. That is, each of the first internal electrode layers was preferably in contact with two or more Ni oxide particles on average (more preferably, three or more on average) in one cross section of the element body, and it was found that the rectification action can thereby further be improved.

From the results of Table 4, it was also found that $NP_L/LE$ is preferably 0.002 particles/μm or more, more preferably 0.005 particles/μm or more.

DESCRIPTION OF THE REFERENCE NUMERICAL

2 . . . multilayer ceramic electronic device
4 . . . element body
4a, 4b . . . end surface
4c . . . side surface
40 . . . capacitance region
41 . . . exterior region
6 . . . external electrode
6a . . . first external electrode
6b . . . second external electrode
10 . . . dielectric layer
11 . . . dielectric particle
13 . . . large particle
13a . . . first large particle
13b . . . second large particle
15 . . . small particle
17 . . . grain boundary 20 . . . internal electrode layer
21 . . . first internal electrode layer
22 . . . second internal electrode layer
31 . . . first boundary
32 . . . second boundary
30 . . . Ni oxide particle
30a . . . first Ni oxide particle
30b . . . second Ni oxide particle

What is claimed is:

1. An electronic device comprising:
an element body including:
   a first internal electrode layer;
   a second internal electrode layer; and
   a dielectric layer laminated between the first internal electrode layer and the second internal electrode layer,
   wherein
Ni oxide particles exist at a first boundary between the first internal electrode layer and the dielectric layer, and
the dielectric layer includes a dielectric large particle in contact with both of the Ni oxide particles at the first boundary and the second internal electrode layer.

2. The electronic device according to claim 1, wherein the Ni oxide particles are in contact with both of two dielectric layers next to each other via the first internal electrode layer.

3. The electronic device according to claim 1, wherein
the first internal electrode layer comprises first internal electrode layers,
the second internal electrode layer comprises second internal electrode layer,
the dielectric layer comprises dielectric layers in the element body, and
each of the first internal electrode layers is in contact with two or more Ni oxide particles on average in a cross section of the element body.

4. The electronic device according to claim 1, wherein
the first internal electrode layer comprises first internal electrode layers,
the second internal electrode layer comprises second internal electrode layer,
the dielectric layer comprises dielectric layers in the element body, and NP1/NP0 is 0.6 or more, in which
   NP0 is a total number of the Ni oxide particles observed in a cross section of the element body, and
   NP1 is a number of the Ni oxide particles existing at the first boundary among the Ni oxide particles observed in the cross section.

5. The electronic device according to claim 1, wherein
the first internal electrode layer comprises first internal electrode layers,
the second internal electrode layer comprises second internal electrode layer,
the dielectric layer comprises dielectric layers in the element body, and
$NP_L/LE$ is 0.002 or more particles/μm, in which
   LE is a total length of the first internal electrode layers and the second internal electrode layers observed in a cross section of the element body, and
   $NP_L$ is a number of the Ni oxide particles in contact with the first internal electrode layers or the second internal electrode layers in a range of the total length LE.

6. The electronic device according to claim 1, wherein $d_P/d_M$ is 3 or more, in which
   $d_M$ is an average particle size of metal crystals contained in the first internal electrode layer and the second internal electrode layer, and
   $d_P$ is an average particle size of the Ni oxide particles.

7. An electronic device comprising:
an element body including:
   a first internal electrode layer;
   a second internal electrode layer; and
   a dielectric layer laminated between the first internal electrode layer and the second internal electrode layer,
   wherein
a p-type semiconductor particle exists at a first boundary between the first internal electrode layer and the dielectric layer, and
the dielectric layer includes a dielectric large particle in contact with both of the p-type semiconductor particle at the first boundary and the second internal electrode layer.

* * * * *

UNITED STATES PATENT AND TRADEMARK OFFICE
CERTIFICATE OF CORRECTION

PATENT NO. : 12,381,040 B2  
APPLICATION NO. : 18/464467  
DATED : August 5, 2025  
INVENTOR(S) : Toshihiro Iguchi et al.

Page 1 of 1

It is certified that error appears in the above-identified patent and that said Letters Patent is hereby corrected as shown below:

On the Title Page

Item (30), insert:  
--Foreign Application Priority Data  
September 29, 2022(JP)................................. 2022-156607--

Signed and Sealed this  
Thirteenth Day of January, 2026

John A. Squires  
*Director of the United States Patent and Trademark Office*